(12) United States Patent
Nishikawa

(10) Patent No.: US 8,948,234 B2
(45) Date of Patent: Feb. 3, 2015

(54) COMMUNICATION APPARATUS AND COMMUNICATION METHOD

(71) Applicant: Icom Incorporated, Osaka (JP)

(72) Inventor: Nobuyoshi Nishikawa, Osaka (JP)

(73) Assignee: Icom Incorporated, Osaka (JP)

( * ) Notice: Subject to any disclaimer, the term of this patent is extended or adjusted under 35 U.S.C. 154(b) by 0 days.

(21) Appl. No.: 14/031,297

(22) Filed: Sep. 19, 2013

(65) Prior Publication Data
US 2014/0079099 A1 Mar. 20, 2014

(30) Foreign Application Priority Data
Sep. 20, 2012 (JP) ................................. 2012-207010

(51) Int. Cl.
H04B 1/38 (2006.01)
H04L 1/00 (2006.01)

(52) U.S. Cl.
CPC ................ *H04L 1/0003* (2013.01); *H04L 1/00* (2013.01)
USPC ........................................................ 375/219

(58) Field of Classification Search
USPC ................................................ 375/219–222
See application file for complete search history.

(56) References Cited

U.S. PATENT DOCUMENTS

| 2010/0166040 | A1* | 7/2010 | Schotten | 375/140 |
| 2011/0103406 | A1* | 5/2011 | Cai et al. | 370/480 |
| 2011/0243127 | A1* | 10/2011 | Li et al. | 370/352 |
| 2013/0057436 | A1* | 3/2013 | Krasner et al. | 342/464 |

FOREIGN PATENT DOCUMENTS

JP 2011-072024 4/2011

* cited by examiner

*Primary Examiner* — Don N Vo
(74) *Attorney, Agent, or Firm* — Warner Norcross & Judd LLP

(57) ABSTRACT

When a changer changes a communication parameter based on a channel characteristic, a selector selects a switch data sequence corresponding to the changed communication parameter. A serial-parallel converter performs a serial-parallel conversion on a switch data sequence. An IFFT unit performs an IFFT. A transmitter synthesizes a calculation result from the IFFT unit to generate data symbol, and generates a transmission frame based on the data symbol. The transmitter then transmits the transmission frame to a second apparatus. A receiver receives a transmission frame from the second apparatus to generate data symbol. An FFT unit performs an FFT on the data symbol to generate a parallel signal. If a correlator determines that a notification of the change in the communication parameter has been correctly transmitted based on an autocorrelation analysis of the parallel signal, a communication apparatus starts communication using the changed communication parameter.

16 Claims, 13 Drawing Sheets ns sion side correlator determines that the retransmission switch data sequence does not match the check data sequence.

COMMUNICATION APPARATUS AND COMMUNICATION METHOD

CROSS-REFERENCE TO RELATED APPLICATION

This application claims the benefit of Japanese Patent Application No. 2012-207010, filed on Sep. 20, 2012, the entire disclosure of which is incorporated by reference herein.

FIELD

This application relates to a communication apparatus and a communication method.

BACKGROUND

In OFDM (Orthogonal Frequency-Division Multiplexing) wireless communication, transmission quality is degraded by fading in a channel. A degree of degradation of the transmission quality is not constant but varies due to noise, interference wave, or the like. Thus, adaptive modulation is performed which involves changing a modulation type for primary modulation, and error correction type and the like according to a channel characteristic indicative of distortion of a phase and an amplitude occurring in a channel between a transmitter and a receiver, as in, for example, an adaptive-modulation controller disclosed in Unexamined Japanese Patent Application Kokai Publication No. 2011-72024. For example, the controller executes adaptive modulation as follows. Upon determining that the phase and the amplitude are not substantially distorted and the channel characteristic is appropriate, the controller prioritizes transmission efficiency and uses 16QAM (Quadrature Amplitude Modulation) as a modulation type for primary modulation. Upon determining that the channel characteristic is degraded, the controller prioritizes improvement of BER (Bit Error Rate) and uses QPSK (Quadrature Phase Shift Keying) as a modulation type.

SUMMARY

If a communication parameter including at least one of the modulation type for primary modulation and the error correction type changed, a notification of the change in the communication parameter needs to be transmitted to a second apparatus. Upon receiving data indicative of the change in the communication parameter, the second apparatus performs an equalization process on the data in order to eliminate the adverse effect of fading in the channel. However, if the channel characteristic is degraded and communication is severely affected by fading, the second apparatus fails to correctly equalize the data and to detect the changed communication parameter. Thus, disadvantageously, the second apparatus fails to correctly demodulate the received signal. Furthermore, compared to communication without the adaptive modulation involving a change in the communication parameter, communication with the adaptive modulation needs to also perform an equalization process on data indicative of the change in the communication parameter. This increases processing time.

In view of these circumstances, it is an object of the present invention to allow the notification of the change in the communication parameter to be more accurately transmitted when adaptive modulation which involves the change in the communication parameter is performed.

To achieve the objective, there is provided a communication apparatus according to a first aspect of the invention, comprising:

a changer that changes a communication parameter based on a channel characteristic;

a selector that selects one of a plurality of switch data sequence for which an autocorrelation function includes a peak present at a position other than an origin and which differ from one another in at least one of the positions and signs of the peak of the autocorrelation function other than the origin, based on the changed communication parameter;

a switch notifier that performs a predetermined process on the switch data sequence selected by the selector to generate a transmission frame and transmits the transmission frame to a second apparatus; and a switch controller that starts wireless communication using the changed communication parameter after the transmission frame is transmitted.

It is preferable that the communication apparatus wherein:
the switch data sequence is a data sequence multiplied predetermined coefficient to the data sequence having an autocorrelation characteristic.

It is preferable that the communication apparatus further comprises:

a receiver that performs a predetermined process on the transmission frame transmitted by the second apparatus to generate a retransmission switch data sequence after the switch notifier has transmitted the transmission frame to the second apparatus; and a transmission side correlator that determines whether or not a notification of the change in the communication parameter has been correctly transmitted to the second apparatus based on the peak of the autocorrelation function for the retransmission switch data sequence, wherein:

when the transmission side correlator determines that the notification of the change in the communication parameter has been correctly transmitted to the second apparatus, the switch controller starts wireless communication using the changed communication parameter, and when the transmission side correlator determines that the notification of the change in the communication parameter has not been correctly transmitted to the second apparatus, the switch controller performs the process again of the switch notifier using transmission power higher than transmission power for the transmission frame transmitted by the switch notifier.

It is preferable that the communication apparatus wherein:
based on the peak of the autocorrelation function for the retransmission switch data sequence, the transmission side correlator determines whether or not the retransmission switch data sequence matches one of the switch data sequence corresponding to the changed communication parameter and a check data sequence used to determine whether or not the notification of the change in the communication parameter has been correctly transmitted to the second apparatus, the selector selects the check data sequence when the transmission side correlator determines that the retransmission switch data sequence matches the switch data sequence corresponding to the changed communication parameter, and the switch controller starts wireless communication using the changed communication parameter when the transmission side correlator determines that the retransmission switch data sequence matches the check data sequence, the switch controller allows the process of the switch notifier to be performed on the check data sequence selected by the selector and allows the processes of the receiver and the transmission side correlator to be repeatedly performed when the transmission side correlator determines that the retransmission switch data sequence matches the switch data sequence corresponding to the changed communication parameter, and the switch controller, when the transmission side correlator determines that the retransmission switch data sequence matches neither of the check data sequence and the switch data sequence corresponding to the changed communication parameter, allows the process of the switch notifier to be performed again on the switch data sequence selected by the selector based on the changed communication parameter, using a transmission power higher than the transmission power for the transmission frame transmitted by the switch notifier and allows the processes of the receiver and the transmission side correlator to be repeatedly performed.

A communication apparatus according to a second aspect of the invention comprising:

a receiver that receives a transmission frame from a second apparatus and performs a predetermined process on the transmission frame to generate a parallel signal;

a reception side correlator that determines whether or not a notification of a change in a communication parameter has been received from the second apparatus based on a plurality of switch data sequence for which an autocorrelation function includes a peak present at a position other than the origin and which differ from one another in at least one of the positions and signs of the peak of the autocorrelation function other than the origin; and a reception side changer that changes the communication parameter to changed communication parameter in the notification received from the second apparatus when the reception side correlator determines that the notification of the change in the communication parameter has been received from the second apparatus.

It is preferable that the communication apparatus wherein:
the switch data sequence is a data sequence multiplied predetermined coefficient to the data sequence having an autocorrelation characteristic.

It is preferable that the communication apparatus further comprises:

a reception side switch notifier that performs a predetermined process on the switch data sequence corresponding to the changed communication parameter to generate the transmission frame and transmits the transmission frame to the second apparatus, when the reception side correlator determines that the notification of the change in the communication parameter has been received from the second apparatus.

It is preferable that the communication apparatus wherein:
based on the peak of the autocorrelation function for the parallel signal, the reception side correlator determines whether or not the parallel signal matches one of the switch data sequence corresponding to the communication parameter and a check data sequence used to determine whether or not the notification of the change in the communication parameter has been correctly received from the second apparatus, the reception side changer changes the communication parameter based on the switch data sequence determined by the reception side correlator to match the parallel signal when the reception side correlator determines that the parallel signal matches with the check data sequence, and the reception side switch notifier performs the predetermined process on the check data sequence or the switch data sequence that is determined to match the parallel signal by the reception side correlator, to generate the transmission frame, and transmits the transmission frame to the second apparatus.

A communication method according to a third aspect of the invention comprising:

a change step of changing a communication parameter based on a channel characteristic;

a selection step of selecting one of a plurality of switch data sequence for which an autocorrelation function includes a peak present at a position other than an origin and which differ from one another in at least one of the positions and signs of the peak of the autocorrelation function other than the origin, based on the changed communication parameter;

a switch notification step of performing a predetermined process on the switch data sequence selected in the selection step to generate a transmission frame and transmitting the transmission frame to a second apparatus; and a switch control step of starting wireless communication using the changed communication parameter after the transmission frame is transmitted.

It is preferable that the communication method wherein:
the switch data sequence is a data sequence multiplied predetermined coefficient to the data sequence having an autocorrelation characteristic.

It is preferable that the communication method further comprises:

a reception step of performing a predetermined process on the transmission frame transmitted by the second apparatus to generate a retransmission switch data sequence after the transmission frame has been transmitted to the second apparatus in the switch notification step; and a transmission side correlation step of determining whether or not a notification of the change in the communication parameter has been correctly transmitted to the second apparatus based on the peak of the autocorrelation function for the retransmission switch data sequence, wherein:

when it is determined that the notification of the change in the communication parameter has been correctly transmitted to the second apparatus in the transmission side correlation step, in the switch control step, starts wireless communication using the changed communication parameter, and when it is determined that the notification of the change in the communication parameter has not been correctly transmitted to the second apparatus in the transmission side correlation step, in the switch control step, allows the process of the switch notification step to be performed again using transmission power higher than transmission power for the transmission frame transmitted in the switch notification step.

It is preferable that the communication method wherein:
in the transmission side correlation step, based on the peak of the autocorrelation function for the retransmission switch data sequence, determines whether or not the retransmission switch data sequence matches one of the switch data sequence corresponding to the changed communication parameter and a check data sequence used to determine whether or not the notification of the change in the communication parameter has been correctly transmitted to the second apparatus, when it is determined that the retransmission switch data sequence matches the switch data sequence corresponding to the changed communication parameter in the transmission side correlation step, selects the check data sequence in the selection step, and in the switch control step, when it is determined that the retransmission switch data sequence matches the check data sequence in the transmission side correlation step, starts wireless communication using the changed communication parameter and in the switch control step, when it is determined that the retransmission switch data sequence matches the switch data sequence corresponding to the changed communication parameter in the transmission side correlation step, allows the process of the switch notification step to be performed on the check data sequence selected in the selection step and allows the processes of the reception step and the transmission side correlation step to be repeatedly performed, and in the switch control step, when it is determined that the retransmission switch data sequence matches neither of the check data sequence and the switch data sequence corresponding to the changed communication parameter in the transmission side correlation step, allows the process of the switch notification step to be performed again on the switch data sequence selected in the selection step based on the changed communication parameter, using transmission power higher than transmission power for the transmission frame transmitted in the switch notification step and allows the processes in the reception step and the transmission side correlation step to be repeatedly performed.

A communication method according to a fourth aspect of the invention comprising:

a reception step of receiving a transmission frame from a second apparatus and performing a predetermined process on the transmission frame to generate a parallel signal;

a reception side correlation step of determining whether or not a notification of a change in a communication parameter has been received from the second apparatus based on a plurality of switch data sequence for which an autocorrelation function includes a peak present at a position other than the origin and which differ from one another in at least one of the positions and signs of the peak of the autocorrelation function other than the origin; and a reception side change step of changing the communication parameter to changed communication parameter in the notification received from the second apparatus when it is determined that the notification of the change in the communication parameter has been received from the second apparatus in the reception side correlation step.

It is preferable that the communication method wherein: the switch data sequence is a data sequence multiplied predetermined coefficient to the data sequence having an autocorrelation characteristic.

It is preferable that the communication method further comprises:

a reception side switch notification step of performing a predetermined process on the switch data sequence corresponding to the changed communication parameter to generate the transmission frame and transmitting the transmission frame to the second apparatus, when it is determined that the notification of the change in the communication parameter has been received from the second apparatus in the reception side correlation step.

It is preferable that the communication method wherein:

in the reception side correlation step, based on the peak of the autocorrelation function for the parallel signal, it is determined whether or not the parallel signal matches one of the switch data sequence corresponding to the communication parameter and a check data sequence used to determine whether or not the notification of the change in the communication parameter has been correctly received from the second apparatus, in the reception side change step, changes the communication parameter based on the switch data sequence determined to match the parallel signal in the reception side correlation step when it is determined that the parallel signal matches the check data sequence in the reception side correlation step, and in the reception side notification step, performs the predetermined process on the check data sequence or the switch data sequence that is determined to match the parallel signal in the reception side correlation step, to generate the transmission frame, and transmits the transmission frame to the second apparatus.

According to the invention, when adaptive modulation is carried out which involves a change in a communication parameter, a notification of the change in the communication parameter can be more accurately transmitted.

BRIEF DESCRIPTION OF THE DRAWINGS

A more complete understanding of this application can be obtained when the following detailed description is considered in conjunction with the following drawings, in which.

DETAILED DESCRIPTION

Figure 1:
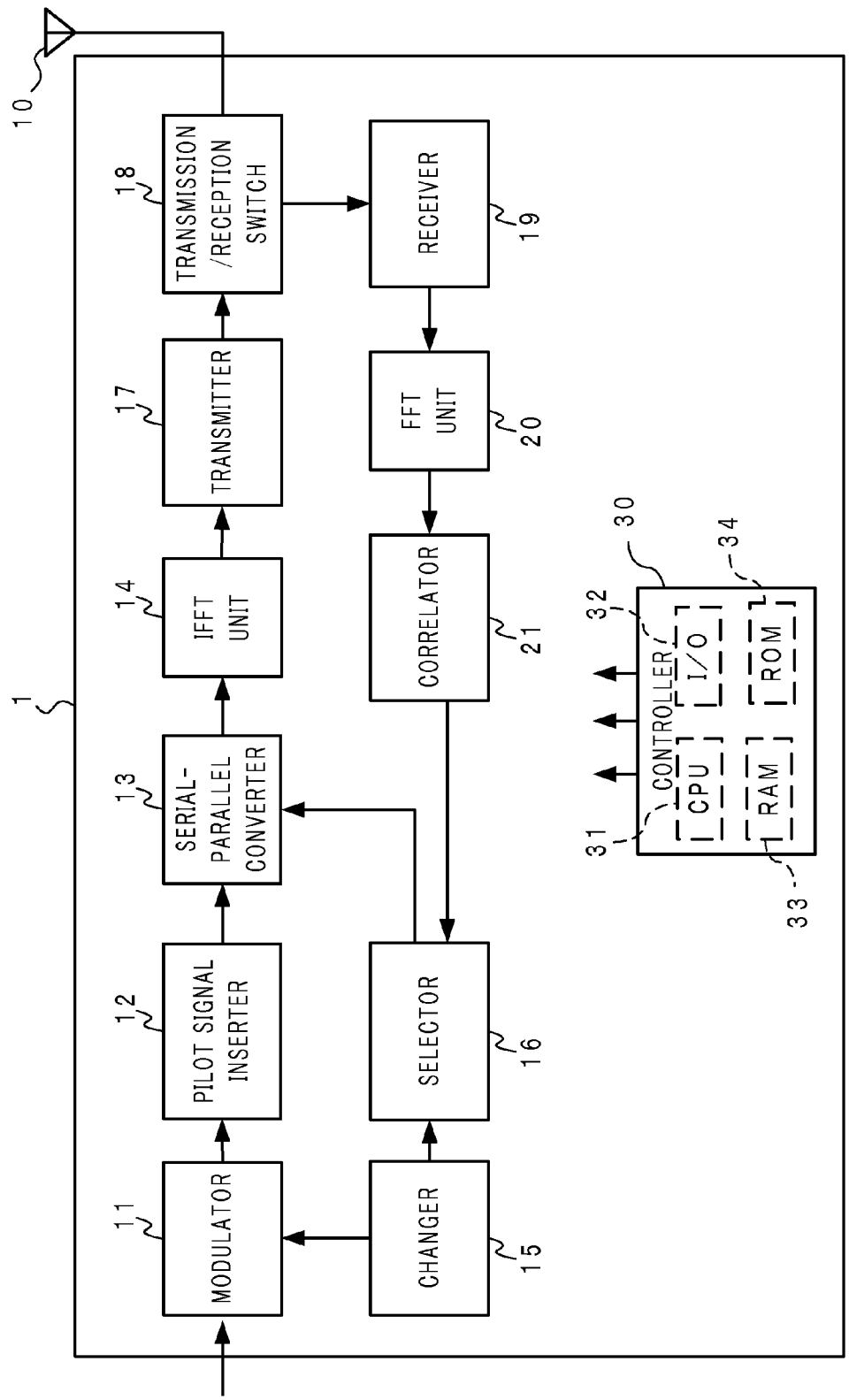
FIG. 1 is a block diagram illustrating a configuration example of a communication apparatus according to an embodiment of the invention.

An exemplary embodiment of the invention will be described in detail herein with reference to the accompanying drawings. Like or same reference numerals are given to those components which are the same as, or correspond to, the components shown in the diagrams. An IFFT (Inverse Fast Fourier Transformation) is a concept including both IFFT and IDFT (Inverse Discrete Fourier Transformation) hereinafter. Therefore, the embodiment may be configured to perform an IDFT instead of an IFFT. Likewise, an FFT (Fast Fourier Transformation) is a concept including both FFT and DFT (Discrete Fourier Transformation) hereinafter. When an IDFT and a DFT are carried out, an FFT size means the size of a DFT hereinafter.

A communication apparatus 1 illustrated in FIG. 1 performs wireless communication with second apparatus using a communication type such as a modulation type primary modulation or an error correction type which enables a communication parameter to be varied. The communication apparatus 1 uses, for example, OFDM (Orthogonal Frequency-Division Multiplexing) wireless communication to communicate with a second apparatus (communication apparatus 4 illustrated in FIG. 2). The error correction type is determined by a coding rate, the type of an error correction code, a constraint length, and the like.

The communication apparatus 1 is, for example, a base station which performs wireless communication with a plurality of terminal stations each corresponding to the second apparatus. Upon changing a communication parameter according to a channel characteristic, the communication apparatus 1 notifies the terminal stations of the change in the communication parameter. According to the present embodiment, the channel represents a wireless channel. The channel characteristic represents a distortion of a phase and an amplitude occurring in the channel between a base station and a terminal station. The communication apparatus 1 comprises an antenna 10, a modulator 11, a pilot signal inserter 12, a serial-parallel converter 13, an IFFT unit 14, a changer 15, a selector 16, a transmitter 17, a transmission/reception switch 18, a receiver 19, an FFT unit 20, a correlator 21, and a controller 30.

The controller 30 comprises a CPU (Central Processing Unit) 31, a RAM (Random Access Memory) 33, and a ROM (Read-Only Memory) 34. Signal lines from the controller 30 to the individual components are omitted to avoid complication and for the ease case of understanding. The controller 30 is connected to the individual components of the communication apparatus 1 via an I/O (Input/Output) 32. The controller 30 controls starting, ending, and contents of processing of the components in the communication apparatus 1.

The RAM 33 stores, for example, data for generating a transmission frames and information on switch data sequence described below. The ROM 34 stores a control program for the controller 30 to control the operation of the communication apparatus 1. The controller 30 controls the communication apparatus 1 based on the control program.

The modulator 11 performs primary modulation on an input signal in accordance with the communication parameter to generate a modulation signal, and transmits the modulation signal to the pilot signal inserter 12. The pilot signal inserter 12 inserts a pilot signal for eliminating the adverse effect of fading in a channel into the modulation signal, and transmits the modulation signal with the pilot signal inserted therein to the serial-parallel converter 13. The serial-parallel converter 13 performs a serial-parallel conversion on the transmitted data, and assigns the resultant data to subcarriers with orthogonal frequency components. The serial-parallel converter 13 transmits the data subjected to the serial-parallel conversion to the IFFT unit 14. The IFFT unit 14 performs an IFFT on the data subjected to the serial-parallel conversion, and transmits a calculation result to the transmitter 17. The transmitter 17 synthesizes the calculation result from the IFFT unit 14 to generate data symbol, and generates a transmission frame based on the data symbol. The transmitter 17 transmits the transmission frame to the second apparatus via the transmission/reception switch 18 and the antenna 10. The above-described processing enables the input signal input to the modulator 11 to be transmitted to the second apparatus as is the case with conventional communication apparatus.

The changer 15 changes the communication parameter based on the channel characteristic, and transmits the changed communication parameter to the modulator 11 and the selector 16. The channel characteristic is detected using a conventional technique. For example, the changer 15 detects the channel characteristic based on the reception field strength of a signal received by the receiver 19, and changes the communication parameter based on the channel characteristic.

If the changer 15 changes the communication parameter, the selector 16 selects and transmits one of a plurality of switch data sequence to the serial-parallel converter 13 based on the changed communication parameter. For the plurality of switch data sequences, an autocorrelation function includes a peak present at a position other than an origin, and at least one of the positions and signs of the peak of the autocorrelation function other than the origin differ from one another. The peak of the autocorrelation function represents the correlation values of the autocorrelation function which exceeds a predetermined range.

The selector 16 may use, for example, the data sequences obtained by each multiplying a predetermined coefficients to any plurality of data sequences having autocorrelation characteristic, as a plurality of switch data sequences. At least two of the predetermined coefficients have an absolute value larger than 0. The data sequence with the autocorrelation characteristic is such that an autocorrelation value for the same data sequence not subjected to data shifting is larger than an autocorrelation value for the data sequence subjected to any data shifting. If a data sequence with the autocorrelation characteristic is used, at least one element of the data sequence subjected to any data shifting has a value different from the value of the same element of the data sequence not subjected to data shifting. The data sequence with the autocorrelation characteristic may use, for example, a CAZAC (Constant Amplitude Zero Auto-Correction) sequence or a PN (Pseudorandom Noise) sequence.

The serial-parallel converter 13 also performs a serial-parallel conversion as described above on a switch data sequence received from the selector 16. The IFFT unit 14 performs an IFFT on the switch data sequence subjected to the serial-parallel conversion, and transmits a calculation result to the transmitter 17. The transmitter 17 synthesizes the calculation result for the switch data sequence from the IFFT unit 14 to generate data symbol. Based on these data symbols, the transmitter 17 inserts null symbol that is data symbol with an amplitude of 0 into the original data symbol as necessary to generate a transmission frame. The transmitter 17 transmits the transmission frame to the second apparatus via the transmission/reception switch 18 and the antenna 10.

The serial-parallel converter 13, the IFFT unit 14, and the transmitter 17 cooperate in operating as a switch notifier which performs a predetermined transmission preprocess on a switch data sequence selected by the selector 16 to generate the transmission frame and which then transmits the transmission frame. Using a switch data sequence having as elements data in a CAZAC or PN sequence multiplied by a predetermined coefficient enables a reduction in the PAPR (Peak-to-Average Power Ratio) of the transmission frame. Thus, the transmitter 17 enables the switch data sequence to be transmitted without distortion even without using a power amplifier having linearity over a wide range.

The receiver 19 receives a transmission frame from the second apparatus via the antenna 10 and the transmission/reception switch 18. The receiver 19 performs symbol synchronization to extract each data symbol, and performs a serial-parallel conversion on the data symbol. The receiver 19 transmits the data symbol subjected to the serial-parallel conversion to the FFT unit 20. The FFT unit 20 performs an FFT on the data symbol subjected to the serial-parallel conversion to generate a retransmission switch data sequence, and transmits the retransmission switch data sequence to the correlator 21. The receiver 19 and the FFT unit 20 cooperate in operating as a receiver which receives a transmission frame and which performs a predetermined reception post-process on the transmission frame to generate a retransmission switch data sequence.

The correlator 21 determines whether or not the notification of the change in the communication parameter has been correctly transmitted to the second apparatus based on the peak of the autocorrelation function for the retransmission switch data sequence. A process performed by the correlator 21 will be described below in detail. The controller 30 also operates as a switch controller. If the correlator 21 determines that the notification of the change in the communication parameter has been correctly transmitted to the second apparatus, the communication apparatus 1 starts wireless communication using the changed communication parameter. Furthermore, if the correlator 21 determines that the notification of the change in the communication parameter has not been correctly transmitted to the second apparatus, the transmitter 17 increases the level of amplification in the power amplifier above the last level, that is, the level for the last transmission of a transmission frame based on the switch data sequence, to increase transmission power. The transmitter 17 retransmits a transmission frame based on the switch data sequence to the second apparatus.

Figure 2:
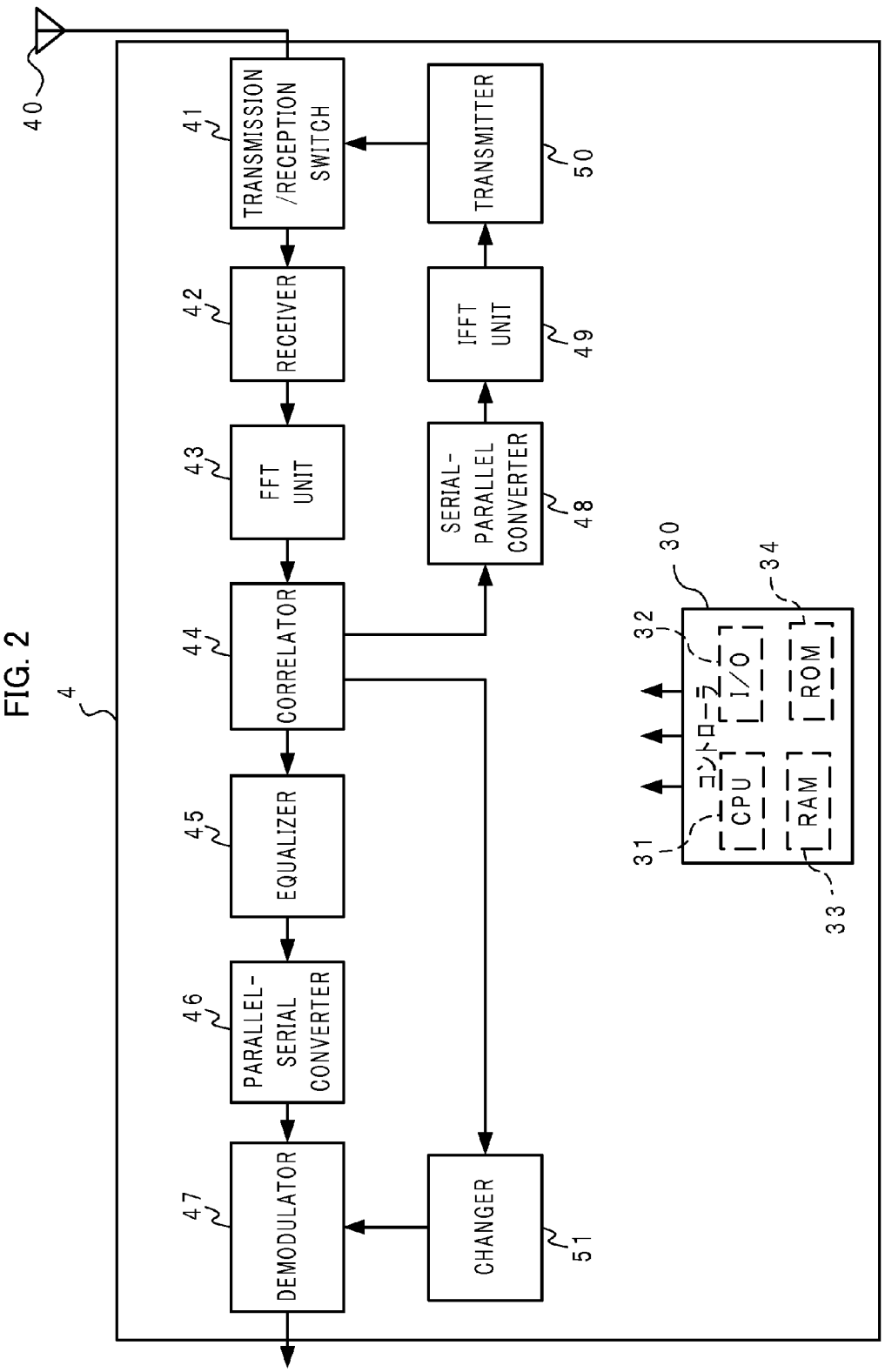
FIG. 2 is a block diagram illustrating a configuration example of another communication apparatus according to the embodiment of the invention.

The communication apparatus 4 illustrated in FIG. 2 is, for example, a terminal station which performs wireless communication with the communication apparatus 1, which is a base station. If the communication apparatus 1 changes the communication parameter according to the channel characteristic, the communication apparatus 4 receives the notification of change in the communication parameter. The communication apparatus 4 performs wireless communication using the same communication type as that for the communication apparatus The communication apparatus 4 comprises an antenna 40, a transmission/reception switch 41, a receiver 42, an FFT unit 43, a correlator 44, an equalizer 45, a parallel-serial converter 46, a demodulator 47, a serial-parallel converter 48, an IFFT unit 49, a transmitter 50, a changer 51, and a controller 30. The controller 30 is configured similarly to the controller 30 of the communication apparatus 1, and controls starting, ending, and contents of processing of the components in the communication apparatus 4.

The receiver 42 receives a transmission frame from the communication apparatus 1 via the antenna 40 and the transmission/reception switch 41. Like the receiver 19 of the communication apparatus 1, the receiver 42 performs symbol synchronization to extract each data symbol, and performs a serial-parallel conversion on the data symbol. The receiver 42 transmits the data symbol subjected to the serial-parallel conversion to the FFT unit 43. The FFT unit 43 performs an FFT on the data symbol subjected to the serial-parallel conversion to generate a parallel signal, and transmits the parallel signal to the correlator 44. The receiver 42 and the FFT unit 43 cooperate in operating as a receiver which receives a transmission frame from the communication apparatus 1 and which performs a predetermined reception post-process on the transmission frame to generate a parallel signal.

The correlator 44 determines whether or not a notification of a change in the communication parameter has been received from the communication apparatus 1 based on the peak of an autocorrelation function for the parallel signal and a plurality of switch data sequences for which the autocorrelation function includes a peak present at a position other than an origin and which differ from one another in at least one of the positions and signs of the peak of the autocorrelation function other than the origin. The plurality of switch data sequences are the same as the plurality of switch data sequences used by the selector 16 of the communication apparatus 1. The communication apparatus 4 is assumed to pre-hold information on the switch data sequence.

If a transmission frame generated on the transmission side by performing a predetermined process on an input signal modulated on the transmission side is received and a parallel signal is generated from the transmission frame and subjected to an autocorrelation analysis, there is a very low probability that the peak of the autocorrelation function occurs at a position other than the origin as is the case with the above-described switch data sequence. This enables the correlator 44 to determine whether or not the parallel signal matches one of the switch data sequence and thus whether or not a notification of a change in the communication parameter has been received from the second apparatus, based on the position and sign of the peak of the autocorrelation function for the parallel signal. Upon determining that a notification of a change in the communication parameter has not been received from the second apparatus, the correlator 44 transmits the parallel signal to an equalizer 45. A process performed by the correlator 44 will be described below in detail.

The equalizer 45 extracts a pilot signal from the parallel signal, and based on the pilot signal, performs an equalization process to eliminate the adverse effect of fading on the parallel signal without the pilot signal. The equalizer 45 performs the equalization process using, for example, zero forcing or the least squares method. The equalizer 45 transmits the parallel signal without the pilot signal subjected to the equalization process to the parallel-serial converter 46. The parallel-serial converter 46 performs a parallel-serial conversion on the transmitted signal and transmits the signal subjected to the parallel-serial conversion to the demodulator 47. The demodulator 47 demodulates the transmitted signal in accordance with the communication parameter. The above-described processing enables the communication apparatus 4 to demodulate a signal from a transmission frame transmitted by the second apparatus as is the case with conventional communication apparatus.

If the correlator 44 determines that a notification of a change in the communication parameter has been received from the second apparatus, the serial-parallel converter 48 performs a serial-parallel conversion on a predetermined switch data sequence based on the notification from the correlator 44. The serial-parallel converter 48 transmits the switch data sequence subjected to the serial-parallel conversion to the IFFT unit 49. The IFFT unit 49 performs an IFFT on the switch data sequence subjected to the serial-parallel conversion, and transmits a calculation result to the transmitter 50. The transmitter 50 synthesizes the calculation result from the IFFT unit 49 to generate data symbol. Based on these data symbols, the transmitter 50 inserts null symbol into the generated symbol as necessary to generate a transmission frame. The transmitter 50 transmits the transmission frame to the second apparatus via the transmission/reception switch 41 and the antenna 40. The serial-parallel converter 48, the IFFT unit 49, and the transmitter 50 cooperate in operating as a switch notifier of reception side. The changer 51 changes the communication parameter based on the notification from the correlator 44, and transmits the changed communication parameter to the demodulator 47.

Figure 3:
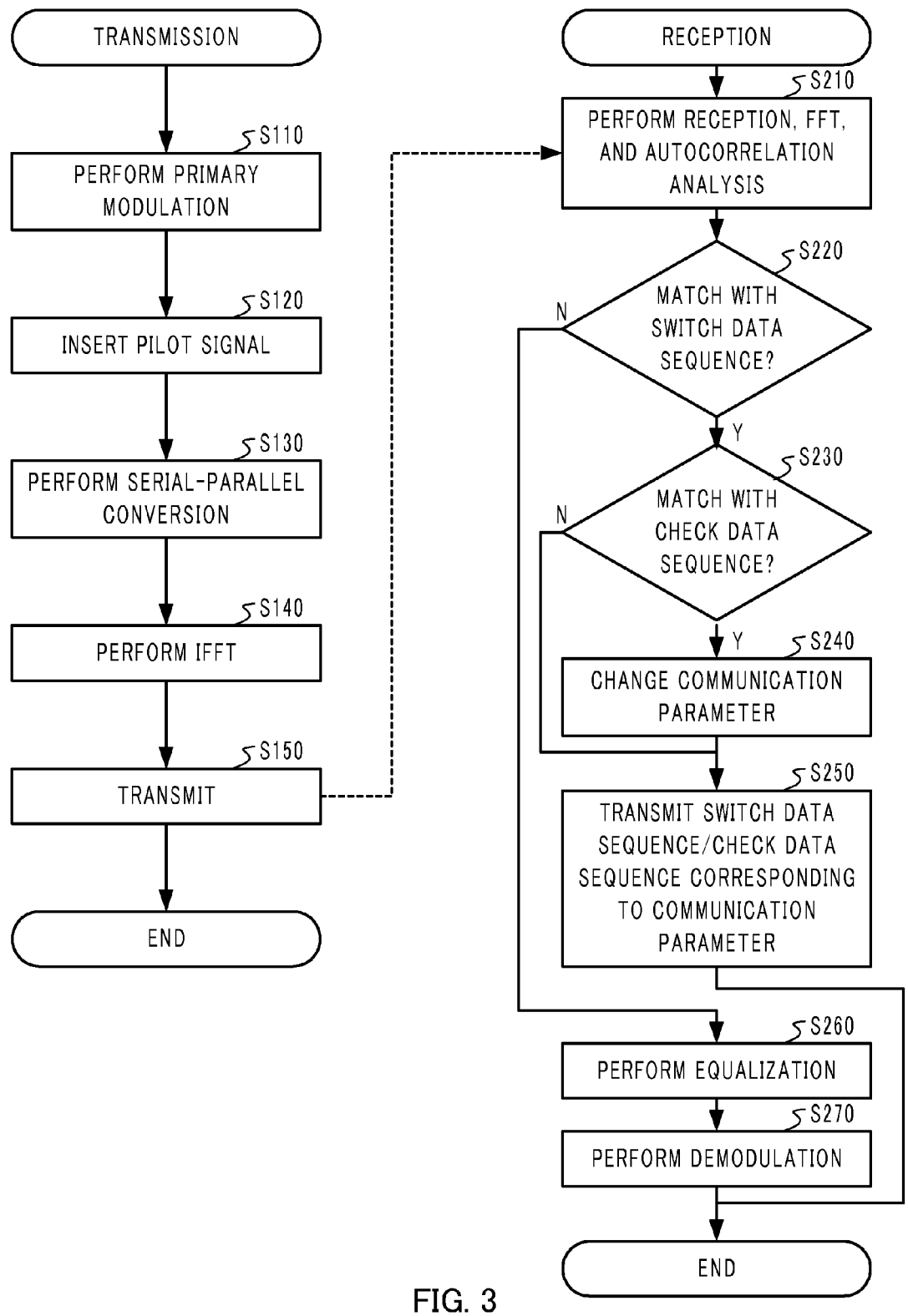
FIG. 3 is a flowchart illustrating an example of the operation for transmission and reception executed by the communication apparatus according to the embodiment.

FIG. 3 is a flowchart illustrating the operation of data transmission and reception between the communication apparatus 1, illustrated in FIG. 1, and the communication apparatus 4, illustrated in FIG. 2.

The modulator 11 performs primary modulation on an input signal in accordance with the communication parameter to generate a modulation signal (step S110). The pilot signal inserter 12 inserts a pilot signal into the modulation signal (step S120). The serial-parallel converter 13 performs a serial-parallel conversion on the transmitted data (step S130). The IFFT unit 14 performs an IFFT on the data subjected to the serial-parallel conversion (step S140). The transmitter 17 synthesizes a calculation result from the IFFT unit 14 to generate data symbol and generates a transmission frame based on the data symbol. The transmitter 17 transmits the transmission frame to the second apparatus via the transmission/reception switch 18 and the antenna 10 (step S150).

The receiver 42 of the communication apparatus 4 receives the transmission frame transmitted by the communication apparatus 1, via the antenna 40 and the transmission/reception switch 41. The receiver 42 performs symbol synchronization to extract each data symbol, and performs a serial-parallel conversion on the data symbol. The FFT unit 43 performs an FFT on the data symbol subjected to the serial-parallel conversion by the receiver 42 to generate a parallel signal. The correlator 44 performs an autocorrelation analysis on the parallel signal (step S210).

The correlator 44 performs an autocorrelation analysis on the parallel signal to determine whether or not the parallel signal matches one of the switch data sequence. If a notification of a change in a parameter has not been received from the communication apparatus 1, the correlator 44 determines that the parallel signal matches none of the switch data sequence (step S220: N), and the correlator 44 transmits the parallel signal to the equalizer 45.

The equalizer 45 extracts a pilot signal from the parallel signal, and based on the pilot signal, performs an equalization process to eliminate the adverse effect of fading on the parallel signal without the pilot signal (step S260). The parallel-serial converter 46 performs a parallel-serial conversion on the parallel signal without the pilot signal subjected to the equalization process. The demodulator 47 demodulates the parallel signal subjected to the parallel-serial conversion in accordance with the communication parameter (step S270). The above-described processing allows the communication apparatus 1 and the communication apparatus 4 to perform normal data transmission and reception. Processing in steps S230 to S250 on the reception side is performed when the communication parameter is changed and will be described below.

The communication apparatus 1 uses one of, for example, BPSK (Binary Phase-Shift Keying), QPSK (Quadrature Phase-Shift Keying), 16QAM (Quadrature Amplitude Modulation), and 64QAM as modulation type included in the communication parameter, based on the channel characteristic. For example, if the FFT size is 2,048, the selector 16 prepares five switch data sequence as expressed by following equation (1). A CAZAC sequence with m elements is denoted by $c_m$. Data with n elements each having a value of 0 is denoted by $0_n$. Any natural numbers are denoted by m and n. Any positive real numbers are denoted by $a_1$, $a_2$, $a_3$, and $a_4$.

[Eq. 1]

$$s_0 = [\alpha_1 \cdot c_{512} \alpha_2 \cdot c_{512} \alpha_3 \cdot c_{512} \alpha_4 \cdot c_{512}]$$

$$s_1 = [\alpha_1 \cdot c_{512} \alpha_2 \cdot c_{512} 0_{512} 0_{512}]$$

$$s_2 = [\alpha_1 \cdot c_{512} - \alpha_2 \cdot c_{512} 0_{512} 0_{512}]$$

$$s_3 = [\alpha_1 \cdot c_{512} 0_{512} \alpha_3 \cdot c_{512} 0_{512}]$$

$$s_4 = [\alpha_1 \cdot c_{512} 0_{512} - \alpha_3 \cdot c_{512} 0_{512}] \quad (1)$$

A switch data sequence $s_0$ is used to check whether or not the notification of the change in the communication parameter has been correctly transmitted (this switch data sequence is hereinafter referred to as a check data sequence). A switch data sequence $s_1$, a switch data sequence $s_2$, a switch data sequence $s_3$, and a switch data sequence $s_4$ correspond to BPSK, QPSK, 16QAM, and 64QAM, respectively. The communication apparatus 4 holds information on the check data sequence $s_0$ and the switch data sequence $s_1$, $s_2$, $s_3$, or $s_4$ corresponding to the modulation type that is the communication parameter. The simple reference to the switch data sequence is hereinafter intended to include the check data sequence and the switch data sequence corresponding to the communication parameter.

For example, if $\alpha_1$, $\alpha_2$, $\alpha_3$, and $\alpha_4$ for the check data sequence $s_0$ is 1 and $\alpha_1$, $\alpha_2$, and $\alpha_3$ for the switch data sequence $s_1$, $s_2$, $s_3$, and $s_4$ are 2, the check data sequence $s_o$ has a PAPR of 6.0 dB, the switch data sequence $s_1$ has a PAPR of 3.0 dB, the switch data sequence $s_2$ has a PAPR of 5.6 dB, the switch data sequence $s_3$ has a PAPR of 5.7 dB, and the switch data sequence $s_4$ has a PAPR of 5.2 dB.

Figure 4:
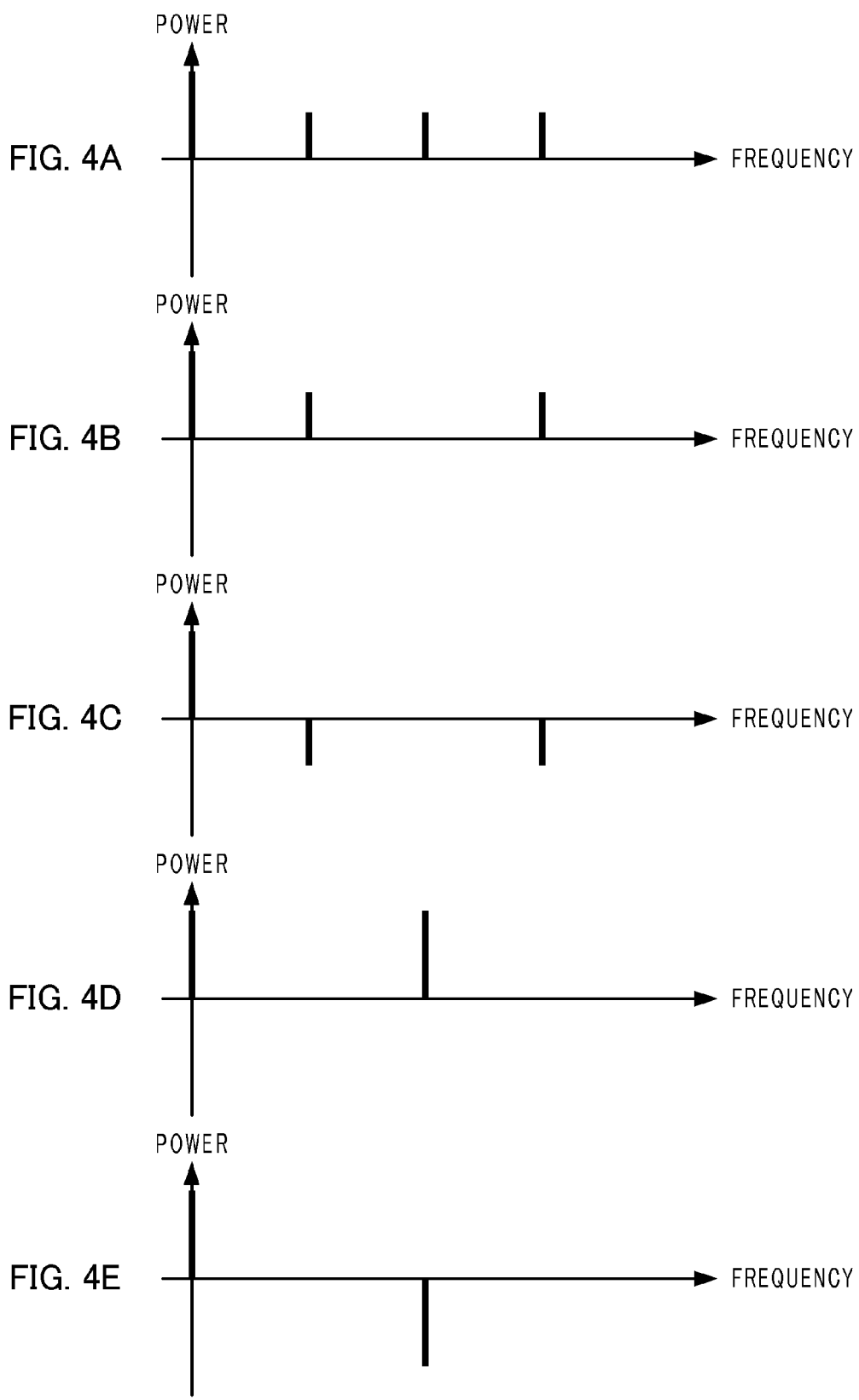
FIGS. 4A to 4E are diagrams illustrating examples of peaks of autocorrelation functions for switch data sequence according to the embodiment.

FIGS. 4A to 4E are diagrams illustrating examples of peaks of autocorrelation functions for switch data sequence. The axis of abscissas represents frequency, and the axis of ordinate represents power indicating correlation value. FIG. 4A illustrates the result of an autocorrelation analysis of the check data sequence $s_0$. FIG. 4B illustrates the result of an autocorrelation analysis of the switch data sequence $s_1$. FIG. 4C illustrates the result of an autocorrelation analysis of the switch data sequence $s_2$. FIG. 4D illustrates the result of an autocorrelation analysis of the switch data sequence $s_3$. FIG. 4E illustrates the result of an autocorrelation analysis of the switch data sequence $s_4$. The check data sequence $s_0$ and the switch data sequence $s_1$, $s_2$, $s_3$, and $s_4$ differ from one another in at least one of the positions and signs of the peak of the autocorrelation function. For example, for the check data sequence $s_0$, if a subcarrier interval is denoted by $f_0$, a positive peak occurs at positions other than the origin which correspond to frequencies 512$f_0$, 1024$f_0$, and 1536$f_0$. As described below, the position and sign of the peak of the autocorrelation function is unlikely to be affected by fading. Thus, the correlator 44 performs an autocorrelation analysis of the parallel signal to enable determination of whether or not the parallel signal matches one of the check data sequence and the switch data sequence corresponding to the communication parameter.

The provision of $0_{512}$ as in the case of the switch data sequence $s_1$, $s_2$, $s_3$, and $s_4$ enables an increase in the number of patterns of the peak position. Varying the position of $0_{512}$ enables the switch data sequence $s_1$, $s_2$, $s_3$, and $s_4$ to be more accurately distinguished from one another. The switch data sequence used by the selector 16 is not limited to the above-described example. Any switch data sequence are usable provided that the autocorrelation function includes a peak present also at a position other than the origin and that distinguishing the switch data sequence from one another is possible.

To further reduce the adverse effect of fading, the selector 16 may use switch data sequence with guard subcarriers as expressed by following equation (2).

[Eq. 2]

$$s'_0 = [0_{184} \alpha_1 \cdot c_{420} \alpha_2 \cdot c_{420} \alpha_3 \cdot c_{420} \alpha_4 \cdot c_{420} 0_{184}]$$

$$s'_1 = [0_{184}\alpha_1 \cdot c_{420}\alpha_2 \cdot c_{420}0_{420}0_{420}0_{184}]$$

$$s'_2 = [0_{184}\alpha_1 \cdot c_{420} - \alpha_2 \cdot c_{420}0_{420}0_{420}0_{184}]$$

$$s'_3 = [0_{184}\alpha_1 \cdot c_{420}0_{420} - \alpha_3 \cdot c_{420}0_{420}0_{184}]$$

$$s'_4 = [0_{184}\alpha_1 \cdot c_{420}0_{420} - \alpha_3 \cdot c_{420}0_{420}0_{184}] \quad (2)$$

For example, if $\alpha_1$, $\alpha_2$, $\alpha_3$, and $\alpha_4$ for a check data sequence $s'_0$ are 1, and $\alpha_1$, $\alpha_2$, and $\alpha_3$ for switch data sequence $s'_1$, $s'_2$, $s'_3$, and $s'_4$ are 2, the check data sequence $s'_o$ has a PAPR of 6.2 dB, the switch data sequence $s'_1$ has a PAPR of 3.7 dB, the switch data sequence $s'_2$ has a PAPR of 5.5 dB, the switch data sequence $s'_3$ has a PAPR of 5.4 dB, and the switch data sequence $s'_4$ has a PAPR of 4.9 dB.

Figure 5:
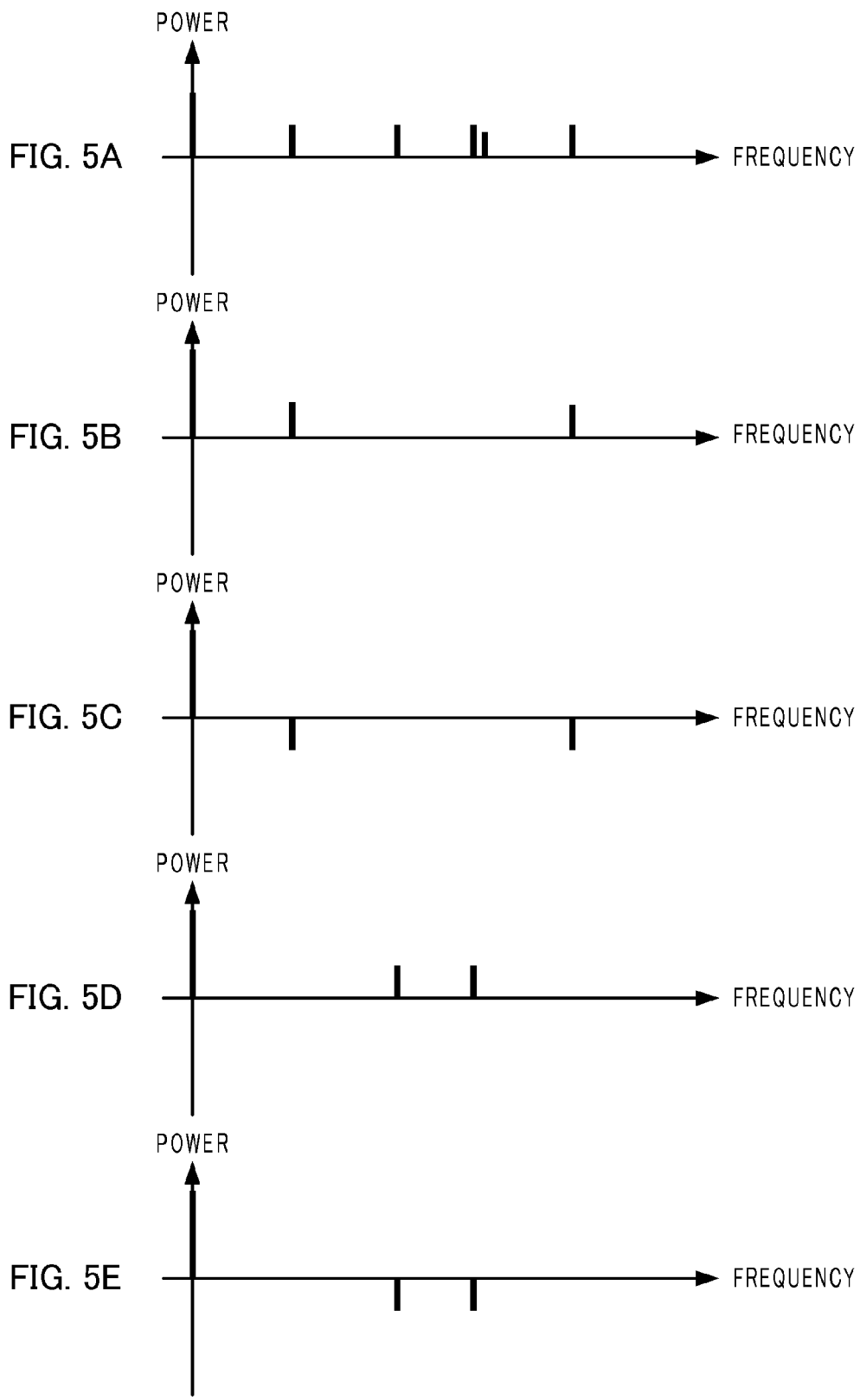
FIGS. 5A to 5E are diagrams illustrating other examples of peaks of autocorrelation functions for switch data sequence according to the embodiment.

FIGS. 5A to 5E are diagrams illustrating examples of the switching data sequence which the peak of the autocorrelation function differs from one another. The axis of abscissas represents frequency, and the axis of ordinate represents power. FIG. 5A illustrates the result of an autocorrelation analysis of the check data sequence $s'_0$. FIG. 5B illustrates the result of an autocorrelation analysis of the switch data sequence $s'_1$. FIG. 5C illustrates the result of an autocorrelation analysis of the switch data sequence $s'_2$. FIG. 5D illustrates the result of an autocorrelation analysis of the switch data sequence $s'_3$. FIG. 5E illustrates the result of an autocorrelation analysis of the switch data sequence $s'_4$. Also for the switch data sequence $s'_0$, $s'_1$, $s'_2$, $s'_3$, and $s'_4$, the correlator 44 performs an autocorrelation analysis of the parallel signal to enable determination of whether or not the parallel signal matches one of the switch data sequences.

Figure 6:
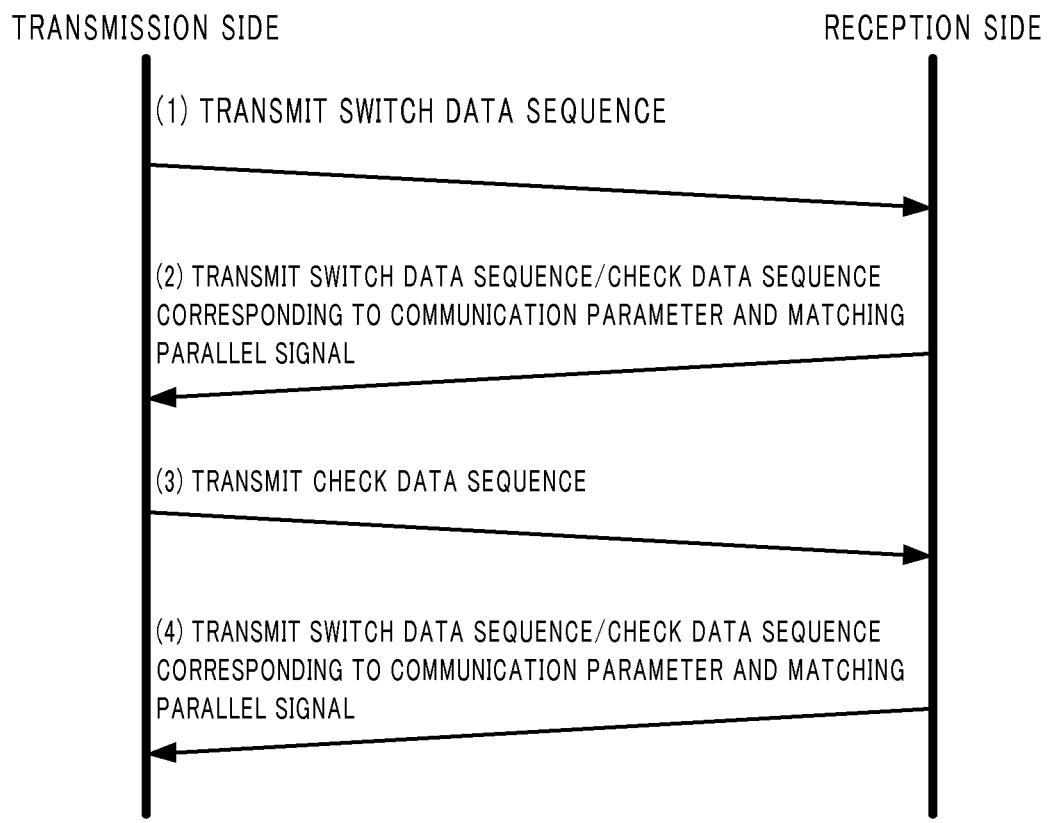
FIG. 6 is a diagram schematically illustrating a notification of a change in a communication parameter executed by the communication apparatus according to the embodiment.

With reference to FIG. 6, an operation will be described in brief in which the communication apparatus 1, which is a base station, notifies the communication apparatus 4, which is a terminal station, of a change in the communication parameter. In FIG. 6, the transmission side is the communication apparatus 1, and the reception side is the communication apparatus 4.

Upon changing the communication parameter, the communication apparatus 1 transmits a transmission frame to the communication apparatus 4 based on the switch data sequence corresponding to the changed communication parameter as illustrated at (1) in FIG. 6. For example, it is assumed that the modulation type included in the current communication parameter is BPSK and that the modulation type included in the communication parameter is changed from BPSK to QPSK. If the check data sequence $s_0$ and the switch data sequence $s_1$, $s_2$, $s_3$, and $s_4$ in equation (1) are used, the communication apparatus 1 transmits a transmission frame based on the switch data sequence $s_2$ corresponding to QPSK to the communication apparatus 4.

The communication apparatus 4 generates a parallel signal from the transmission frame received from the communication apparatus 1. Then, if the parallel signal matches one of the check data sequence and the switch data sequence corresponding to the communication parameter, the communication apparatus 4 transmits, to the communication apparatus 1, a transmission frame based on the check data sequence or the switch data sequence corresponding to the communication parameter and matching the parallel signal, as illustrated at (2) in FIG. 6. In the above-described example, the communication apparatus 1 has transmitted the transmission frame based on the switch data sequence $s_2$ corresponding to QPSK. Thus, the communication apparatus 4 transmits the transmission frame based on the switch data sequence $s_2$ corresponding to QPSK to the communication apparatus 1.

The communication apparatus 1 generates a retransmission switch data sequence from the transmission frame received from the communication apparatus 4, and determines whether or not the retransmission switch data sequence matches the switch data sequence corresponding to the changed communication parameter. If the retransmission switch data sequence fails to match the switch data sequence corresponding to the changed communication parameter, the communication apparatus 1 increases the level of amplification in the power amplifier of the transmitter 17 above the level for the last processing at (1) in FIG. 6 to increase transmission power. The communication apparatus 1 then performs the processing at (1) in FIG. 6 again. If the retransmission switch data sequence matches the switch data sequence corresponding to the changed communication parameter, the communication apparatus 1 transmits a transmission frame based on the check data sequence to the communication apparatus 4 as illustrated at (3) in FIG. 6. In the above-described example, the communication apparatus 4 has transmitted the transmission frame based on the switch data sequence $s_2$. Thus, the communication apparatus 1 transmits the transmission frame based on the check data sequence $s_0$ to the communication apparatus 4.

The communication apparatus 4 generates a parallel signal from the transmission frame received from the communication apparatus 1. Then, if the parallel signal matches one of the check data sequence and the switch data sequence corresponding to the communication parameter, the communication apparatus 4 transmits, to the communication apparatus 1, a transmission frame based on the check data sequence or the switch data sequence corresponding to the communication parameter and matching the parallel signal, as illustrated at (4) in FIG. 6. If the parallel signal matches the check data sequence, the communication apparatus 4 changes the communication parameter to a communication parameter corresponding to the switch data sequence transmitted to the communication apparatus 1 at (2) in FIG. 6. In the above-described example, the communication apparatus 1 has transmitted the transmission frame based on the check data sequence $s_0$. Thus, the communication apparatus 4 changes the modulation type included in the communication parameter to QPSK and transmits the transmission frame based on the check data sequence $s_0$ to the communication apparatus 1.

The communication apparatus 1 generates a retransmission switch data sequence from the transmission frame received from the communication apparatus 4, and determines whether or not the retransmission switch data sequence matches the check data sequence. If the retransmission switch data sequence fails to match the check data sequence, the communication apparatus 1 increases the level of amplification in the power amplifier of the transmitter 17 above the level for the last processing at (1) in FIG. 6 to increase transmission power. The communication apparatus 1 then performs the processing at (1) in FIG. 6 again. If the retransmission switch data sequence matches the check data sequence, the communication apparatus 1 starts wireless communication using the changed communication parameter.

Figure 7:
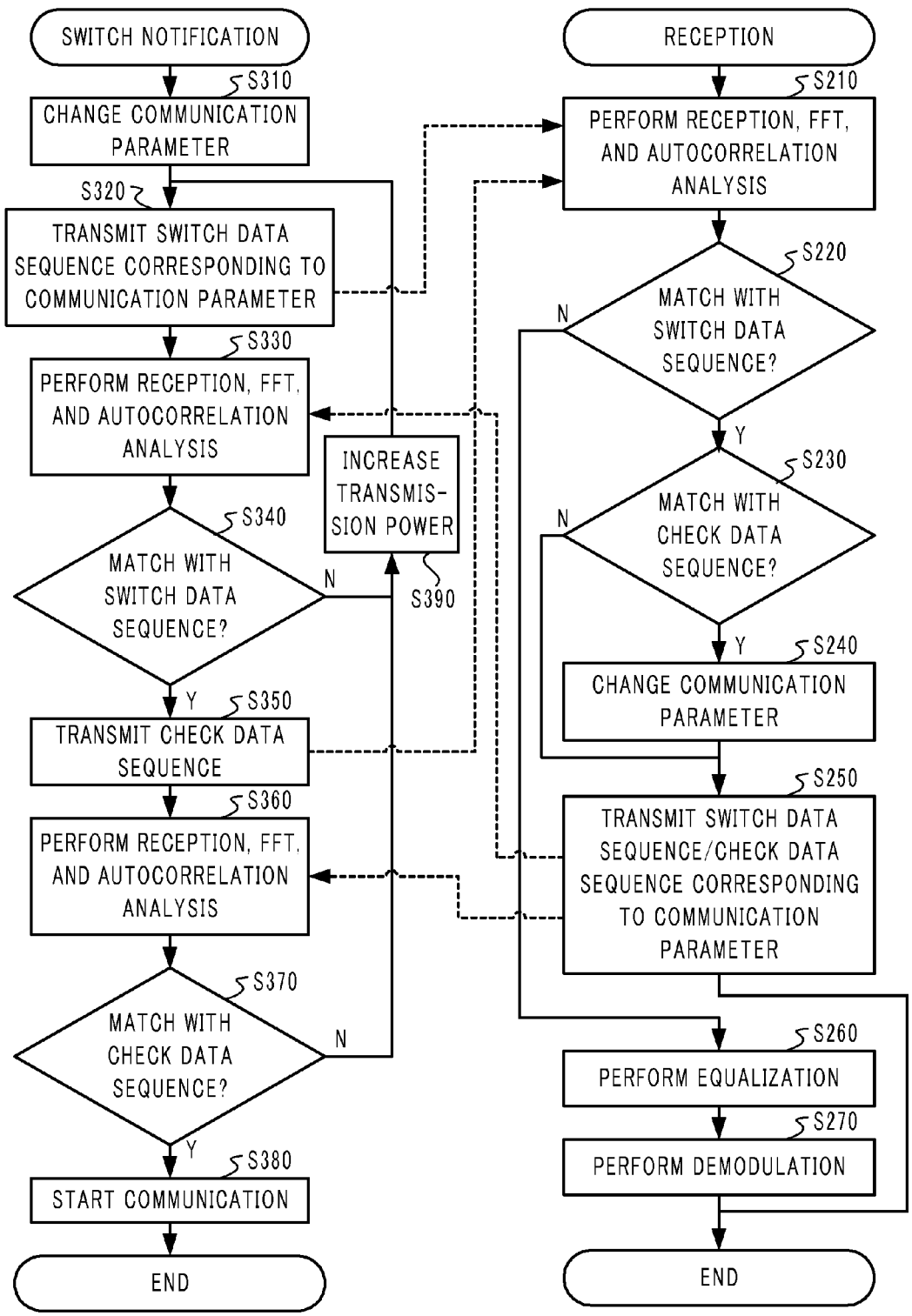
FIG. 7 is a flowchart illustrating an example of an operation for notification of the change in the communication parameter executed by the communication apparatus according to the embodiment.

With reference to FIG. 7, the operation will be described in detail in which the communication apparatus 1, which is a base station, notifies the communication apparatus 4, which is a terminal station, of a change in the communication parameter.

The changer 15 changes the communication parameter based on the channel characteristic (step S310). The selector 16 selects one of a plurality of switch data sequences based on the changed communication parameter. The serial-parallel converter 13 performs a serial-parallel conversion on the selected switch data sequence. The IFFT unit 14 performs an IFFT on the switch data sequence subjected to the serial-parallel conversion. The transmitter 17 synthesizes a calculation result from the IFFT unit 14 to generate data symbol and generates a transmission frame based on the data symbol. The transmitter 17 transmits the transmission frame to the communication apparatus 4 via the transmission/reception switch 18 and the antenna 10 (step S320).

The receiver 42 of the communication apparatus 4 receives the transmission frame transmitted by the communication apparatus 1, via the antenna 40 and the transmission/reception switch 41. The receiver 42 performs symbol synchronization to extract each data symbol, and performs a serial-parallel conversion on the data symbol. The FFT unit 43 performs a FFT on the data symbol subjected to the serial-parallel conversion to generate a parallel signal. The correlator 44 performs an autocorrelation analysis on the parallel signal (step S210).

Processing to be performed if the correlator 44 determines that the parallel signal matches none of the switch data sequences (step S220: N) is similar to the processing described above with reference to FIG. 3. Upon determining that the parallel signal matches the switch data sequence corresponding to the communication parameter (step S220: Y and step S230: N), the correlator 44 transmits, to the serial-parallel converter 48, a notification indicating that the parallel signal matches the switch data sequence corresponding to the communication parameter. The serial-parallel converter 48 performs a serial-parallel conversion on the switch data sequence corresponding to the communication parameter matching the parallel signal. Then, the IFFT unit 49 performs an IFFT on the switch data sequence subjected to the serial-parallel conversion. The transmitter 50 synthesizes a calculation result from the IFFT unit 49 to generate data symbol and generates a transmission frame based on the data symbol. The transmitter 50 transmits the transmission frame to the communication apparatus 1 via the transmission/reception switch 41 and the antenna 40 (step S250).

The receiver 19 of the communication apparatus 1 receives the transmission frame from the communication apparatus 4 via the antenna 10 and the transmission/reception switch 18. The receiver 19 performs symbol synchronization to extract each data symbol, and performs a serial-parallel conversion on the data symbol. The FFT unit 20 performs an FFT on the data symbol subjected to the serial-parallel conversion to generate a retransmission switch data sequence. The correlator 21 performs an autocorrelation analysis on the retransmission switch data sequence (step S330).

The correlator 21 performs an autocorrelation analysis on the retransmission switch data sequence to determine whether or not the retransmission switch data sequence matches the switch data sequence corresponding to the changed communication parameter. Upon determining that the retransmission switch data sequence fails to match the switch data sequence corresponding to the changed communication parameter (step S340: N), the correlator 21 notifies the transmitter 17 of the determination result. The transmitter 17 increases the level of amplification in the power amplifier above the last level to increase transmission power (step S390). The transmitter 17 returns to step S320 to retransmit a transmission frame based on the changed communication parameter. The above-described processing is then repeated.

Upon determining that the retransmission switch data sequence matches switch data sequence corresponding to the changed communication parameter (step S340: Y), the correlator 21 notifies the selector 16 of the determination result. Based on the notification from the correlator 21, the selector 16 selects the check data sequence. The serial-parallel converter 13 performs a serial-parallel conversion on the check data sequence. The IFFT unit 14 performs an IFFT on the check data sequence subjected to the serial-parallel conversion.

The transmitter 17 synthesizes a calculation result from the IFFT unit 14 to generate data symbol and generates a transmission frame based on the data symbol. The transmitter 17 transmits the transmission frame to the communication apparatus 4 via the transmission/reception switch 18 and the antenna 10 (step S350).

The communication apparatus 4 executes the processing in step S210 as described above. Upon determining that the parallel signal matches the check data sequence (step S220: Y and step S230: Y), the correlator 44 transmits the determination result to the serial-parallel converter 48 and the changer 51. The changer 51 changes the communication parameter to the communication parameter most recently determined by the correlator 44 to match the parallel signal, based on the switch data sequence corresponding to the communication parameter and determined to match the parallel signal (step S240). Based on a notification from the correlator 44, the serial-parallel converter 48 performs a serial-parallel conversion on the check data sequence. The IFFT unit 49 performs an IFFT on the check data sequence subjected to the serial-parallel conversion. The transmitter 50 synthesizes a calculation result from the IFFT unit 49 to generate data symbol and generates a transmission frame based on the data symbol. The transmitter 50 transmits the transmission frame to the communication apparatus 1 via the transmission/reception switch 41 and the antenna 40 (step S250).

As is the case with step S330, the receiver 19 of the communication apparatus 1 receives the transmission frame from the communication apparatus 4 via the antenna 10 and the transmission/reception switch 18. The receiver 19 performs symbol synchronization to extract each data symbol, and performs a serial-parallel conversion on the data symbol. The FFT unit 20 performs a FFT on the data symbol subjected to the serial-parallel conversion to generate a retransmission switch data sequence. The correlator 21 performs an autocorrelation analysis on the retransmission switch data sequence (step S360).

If the correlator 21 determines that the retransmission switch data sequence fails to match the check data sequence (step S370: N), the transmitter 17 increases the level of amplification in the power amplifier of the transmitter 17 above the last level to increase transmission power (step S390). The transmitter 17 returns to step S320 to retransmit a transmission frame based on the changed communication parameter. The above-described processing is then repeated.

If the correlator 21 determines that the retransmission switch data sequence matches the check data sequence (step S370: Y), the communication apparatus 1 starts wireless communication using the changed communication parameter (step 380). Subsequently, the communication apparatus 1 performs a transmission process illustrated in FIG. 3 using the changed communication parameter. Furthermore, the communication apparatus 4 performs a reception process illustrated in FIG. 3 using the changed communication parameter.

The method of notification of the change in the communication parameter is not limited to the above-described flow. For example, the flow may be configured as follows. The communication apparatus 1 transmits a transmission frame in steps S320 or S350. Then, if the communication apparatus 1 receives no signal from the communication apparatus 4 within a predetermined time after the transmission, the communication apparatus 1 considers this to be a timeout and proceeds to step S390.

Furthermore, the notification of the change in the communication parameter may be transmitted, for example, using only the switch data sequence corresponding to the communication parameter. In this case, if the correlator 21 determines, in step S220, determines that the parallel signal matches the switch data sequence, the flow proceeds to step S240. In step S240, the communication parameter is changed to the communication parameter corresponding to the switch data sequence. In step S260, the transmission frame based on the switch data sequence is transmitted. If, in step S330, the retransmission switch data sequence matches the switch data sequence corresponding to the changed communication parameter, the communication apparatus 1 proceeds to step S380 to start wireless communication using the changed communication parameter.

Additionally, if the communication apparatus 1 has not transmitted any notification of a change in the communication parameter but the communication apparatus 4 mistakenly determines that the parallel signal matches the switch data sequence corresponding to the communication parameter and transmits a transmission frame based on the switch data sequence, the communication apparatus 1 may start the process from step S330 of the above-described below. In this case, no changed communication parameter is present, and thus, the communication apparatus 1 determines whether or not the retransmission switch data sequence matches the current communication parameter. Then, the processing in step S330 and the subsequent steps is performed.

If a transmission frame is received which has been generated by the transmission side by modulating an input signal and performing a predetermined process on the modulated input signal and a parallel signal is generated from the transmission frame and subjected to an autocorrelation analysis, it is very unlikely that the autocorrelation function includes a peak present at a position other than the origin as is the case with the above-described switch data sequence. Thus, using a switch data sequence for which the autocorrelation function includes a peak present at a position other than the origin enables a notification of a change in the communication parameter to be more accurately transmitted. The switch data sequence has an autocorrelation characteristic and is unlikely to be affected by fading in the channel. This eliminates the need for the transmission side to insert a pilot signal and for the reception side to perform an equalization process based on the pilot signal, enabling a reduction in processing time.

As described above, if the transmission side fails to determine that a notification of a change in the communication parameter has been correctly transmitted, the transmission side increases the transmission power above the last value and then transmits a notification of the change in the communication parameter again. This enables the notification of the change in the communication parameter to be more accurately transmitted. Furthermore, using the check data sequence to determine whether or not the change in the communication parameter has been accurately determined enables the notification of the change in the communication parameter to be further accurately transmitted.

Figure 8:
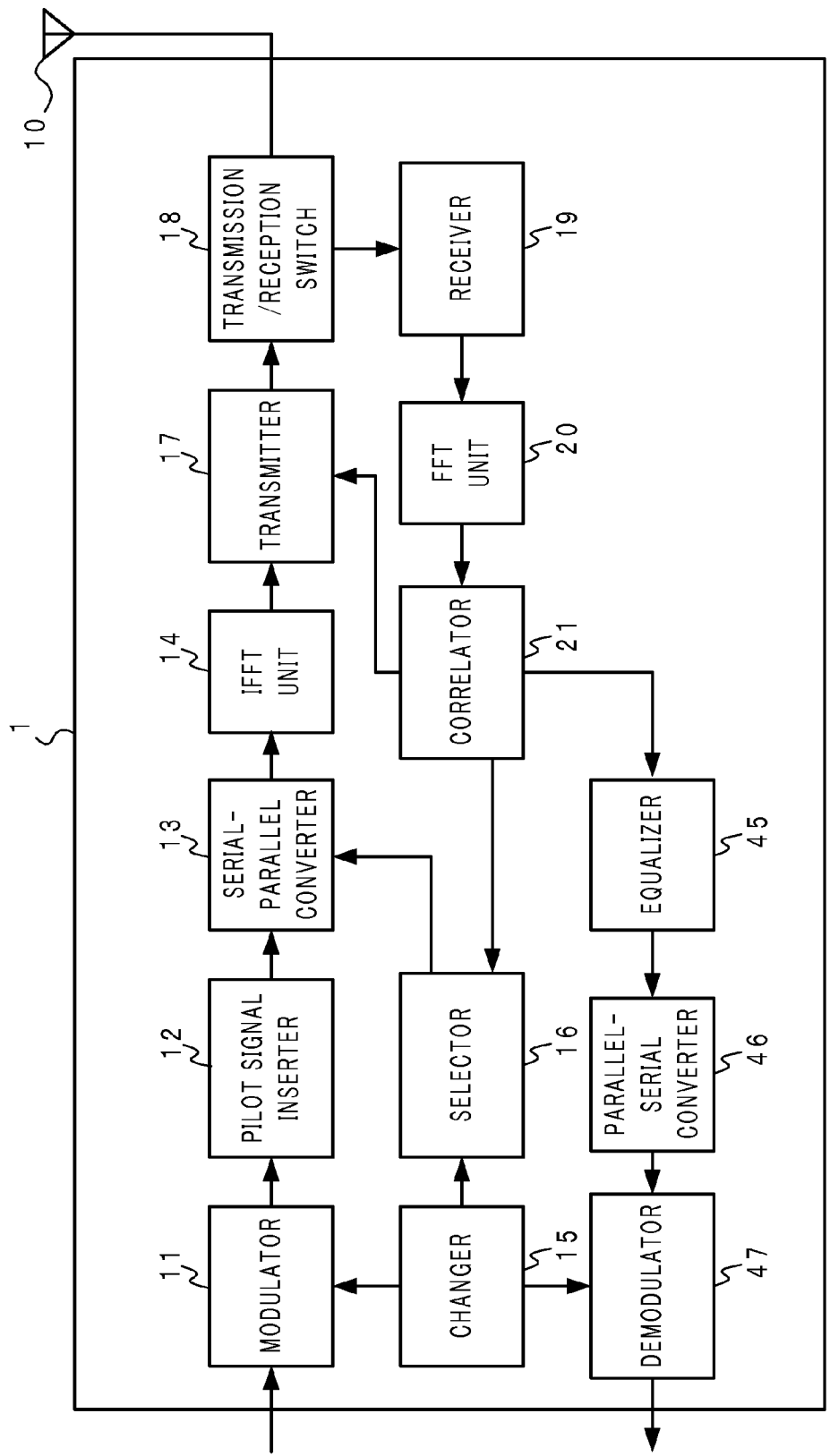
FIG. 8 is a block diagram illustrating a configuration example of another communication apparatus according to the embodiment.

The communication apparatus 1 illustrated in FIG. 8 corresponds to the communication apparatus 1 illustrated in FIG. 1 and including a reception function provided in the conventional communication apparatus. The controller 30 is omitted from FIG. 8. Upon changing the communication parameter, the changer 15 transmits the changed communication parameter not only to the modulator 11 but also to the demodulator 47. If the retransmission switch data sequence matches none of the switch data sequence, the correlator 21 transmits the retransmission switch data sequence to the equalizer 45. The operations of the equalizer 45, the parallel-serial converter 46, and the demodulator 47 are similar to the operations in the communication apparatus 4 illustrated in FIG. 2

Figure 9:
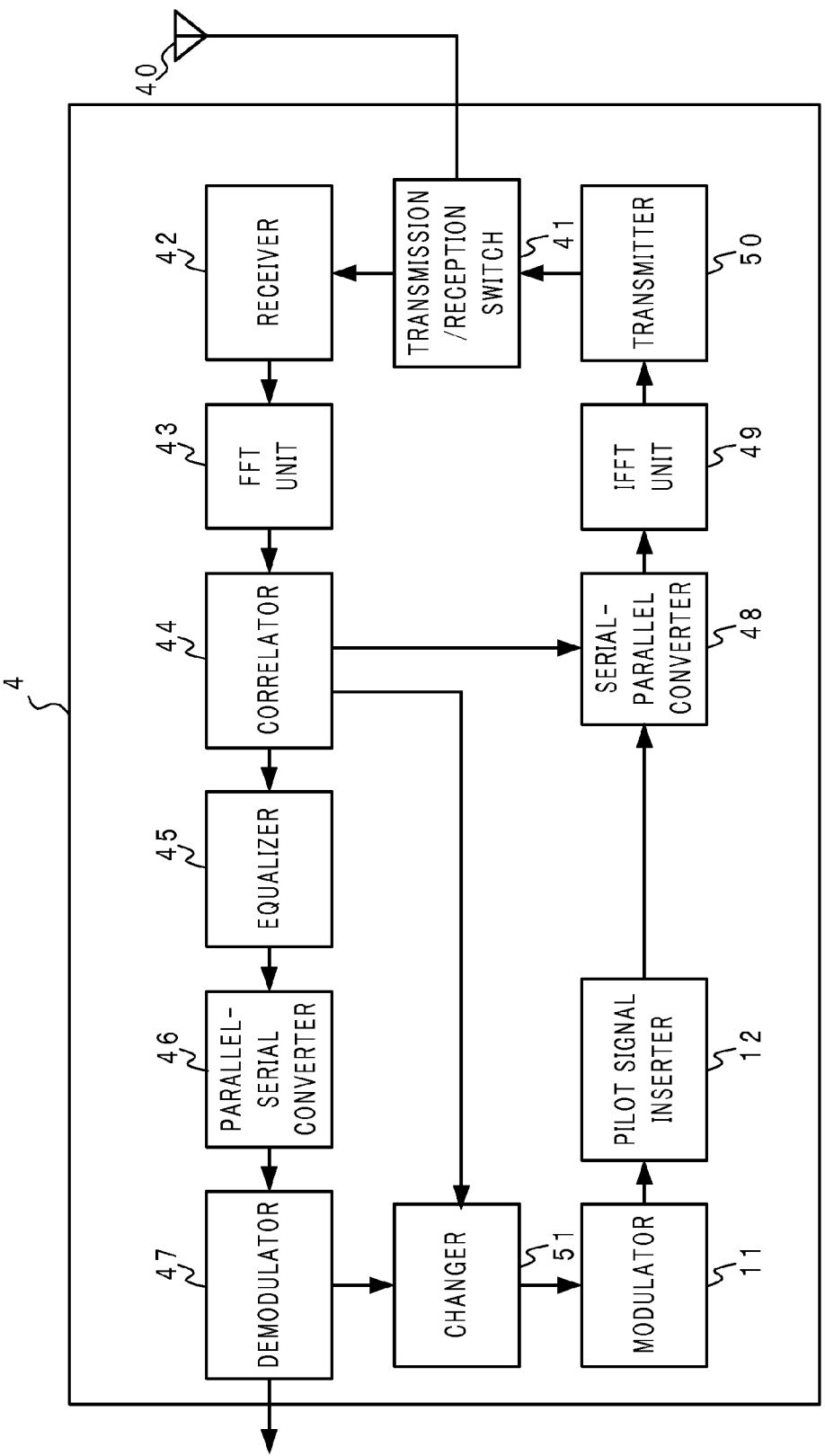
FIG. 9 is a block diagram illustrating a configuration example of another communication apparatus according to the embodiment.

The communication apparatus 4 illustrated in FIG. 9 corresponds to the communication apparatus 4 illustrated in FIG. 2 and including a transmission function provided in the conventional communication apparatus. The operations of the modulator 11 and the pilot signal inserter 12 are similar to the operations in the communication apparatus illustrated in FIG. 1. The serial-parallel converter 48 performs a serial-parallel converter on a modulation signal with a pilot signal inserted therein and transmits data resulting from the serial-parallel converter to the IFFT unit 49. The IFFT unit 49 performs an IFFT on the data resulting from the serial-parallel converter, and transmits a calculation result to the transmitter 50. The transmitter 50 synthesizes the calculation result from the IFFT unit 49 to generate data symbol and generates a transmission frame based on the data symbol. The transmitter 50 transmits the transmission frame to the second apparatus (communication apparatus 1) via the transmission/reception switch 41 and the antenna 40. The changer 51 transmits the changed communication parameter not only to the demodulator 47 but also to the modulator 11.

As described above, in performing adaptive modulation involving a change in the communication parameter, the communication apparatus 1 and 4 according to the embodiment of the present invention use the switch data sequence for which the autocorrelation function includes a peak present at a position other than the origin. This enables the notification of the change in the communication parameter to be more accurately transmitted.

Specific Example

Figure 10A:
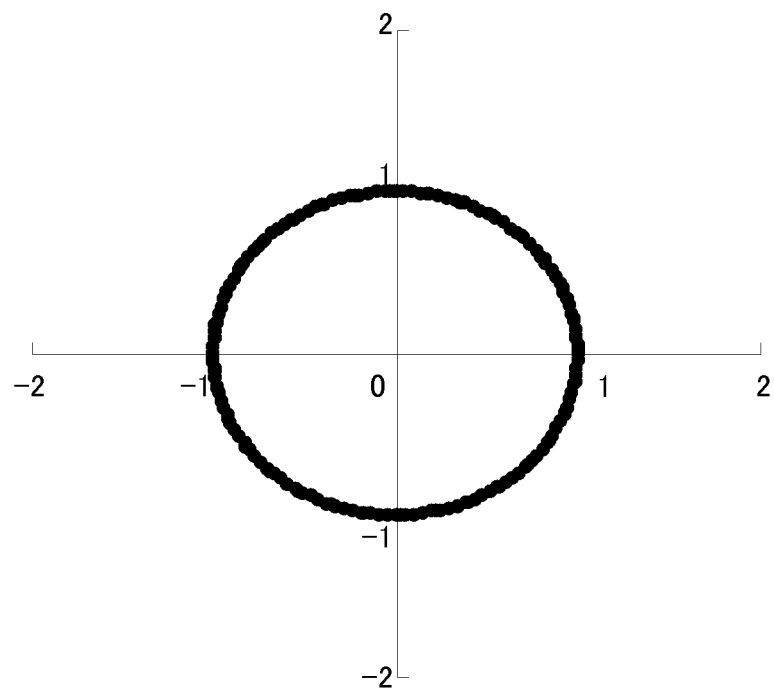
FIGS. 10A and 10B are diagrams illustrating the adverse effect of fading on a signal.

The adverse effect of fading on the check data sequence $s_0$ was simulated with $\alpha_1$, $\alpha_2$, $\alpha_3$, and $\alpha_4$ for the check data sequence $s_0$ in equation (1) described above set to 1. FIG. 10A is a diagram illustrating, on a complex plane, the check data sequence $s_0$ before transmission.

Figure 10B:
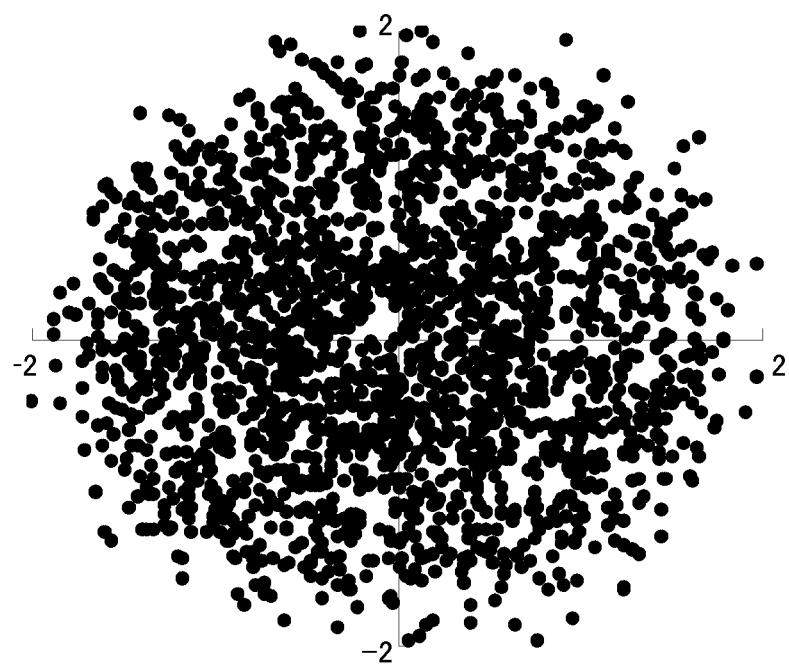

FIG. 10B is a diagram illustrating, on a complex plane, the check data sequence $s_0$ restored by the transmission side via a channel and not subjected to an equalization process yet. FIG. 10B illustrates that the amplitude and phase of each element of the check data sequence $s_0$ has been changed by fading.

Figure 11A:
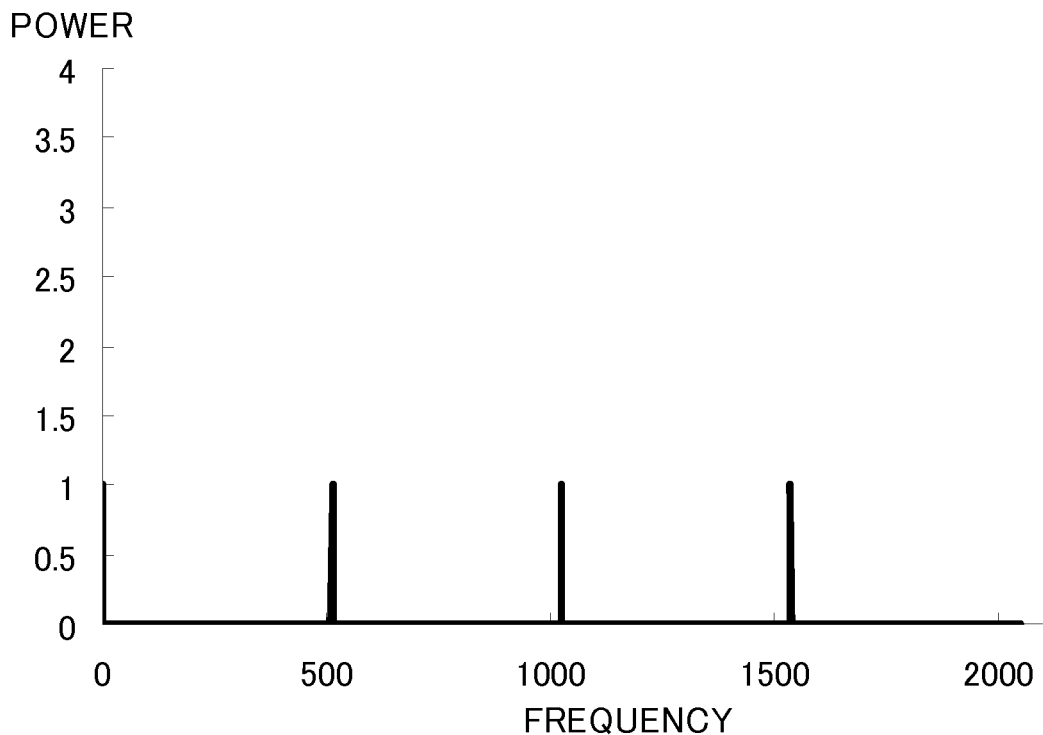
FIGS. 11A and 11B are diagrams illustrating the adverse effect of fading on the peak of the autocorrelation function.
Figure 11B:
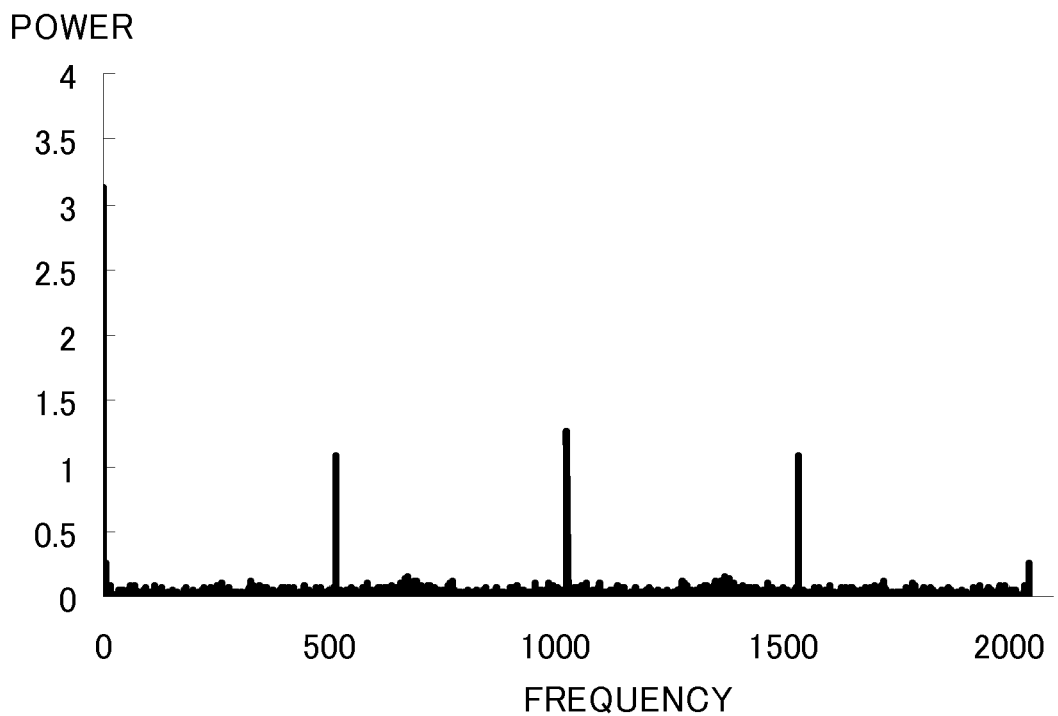

FIGS. 11A and 11B are diagrams illustrating the adverse effect of fading on the peak of the autocorrelation function. The axis of abscissas represents frequency (unit: subcarrier interval $f_0$). The axis of ordinate represents power indicative of a correlation value. FIG. 11A illustrates the results of an autocorrelation analysis of the check data sequence $s_0$ before transmission. FIG. 11B illustrates the results of an autocorrelation analysis of the check data sequence $s_0$ restored by the reception side via the channel and not subjected to an equalization process yet. The results of the autocorrelation analysis indicate that the check data sequence $s_0$ has not substantially been affected by fading, with the position and sign of the peak of the autocorrelation function remaining the same as the position and sign observed before transmission. For the switch data sequence corresponding to the communication parameter, the position and sign of the peak of the autocorrelation function remains the same as the position and sign observed before transmission, as is the case with the check data sequence. This indicates that using the check data sequence and the switch data sequence corresponding to the communication parameter as described above enables a notification of a change in the communication parameter to be more accurately transmitted.

Figure 12:
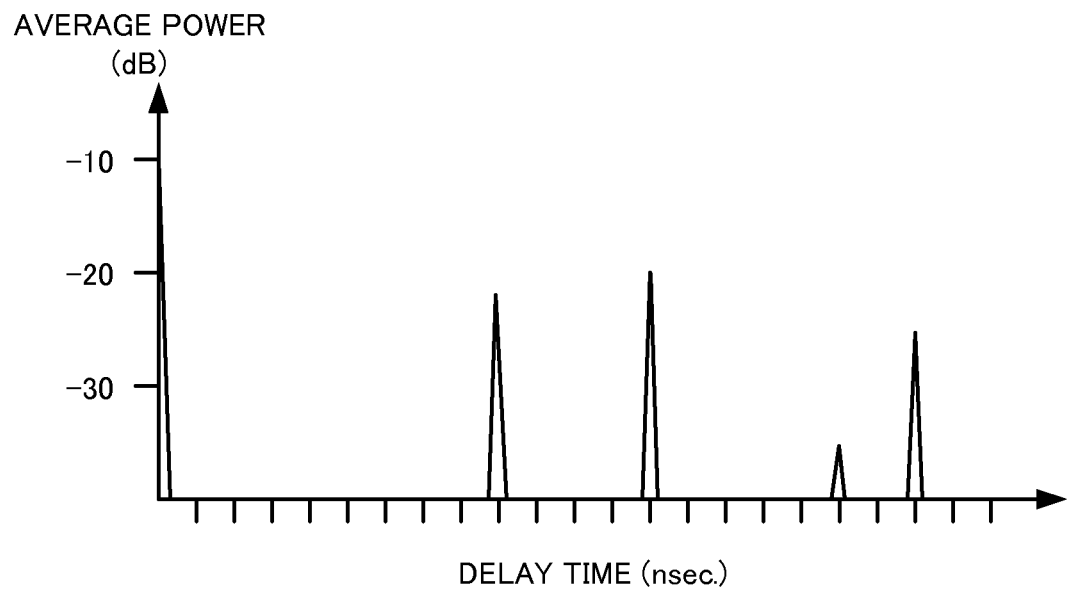
FIG. 12 is a diagram illustrating a general delay profile of a channel used for simulation.

In the simulation illustrated in FIGS. 10A, 10B and FIGS. 11A, 11B, the number of multipath was 6, and the number of wavelets arriving at the reception side antenna was 32. Furthermore, values illustrated in Table 1 were used as a delay profile indicative of the relation between the delay time of a multipath delay formed of wavelets and average power that is the average of power received by the antenna during a predetermined interval including a predetermined number of wavelengths. FIG. 12 is a schematic diagram of a delay profile of a channel used for the simulation.

TABLE 1

| Delay time (nsec.) | Average power (dB) |
|---|---|
| 0 | −2.5 |
| 300 | 0 |
| 8900 | −12.8 |
| 12900 | −10.0 |
| 17100 | −25.2 |
| 20000 | −16.0 |

In connection with a Doppler shift, a reference subcarrier frequency was set to 5.6 GHz, and moving speed of the transmission side communication apparatus was a variable. In the simulation by OFDM, interleaving and error correction were not performed. Furthermore, a signal formed of elements all having a value of 1 was used as the pilot signal, and equalization was performed by the zero-forcing at the reception side.

Figure 13:
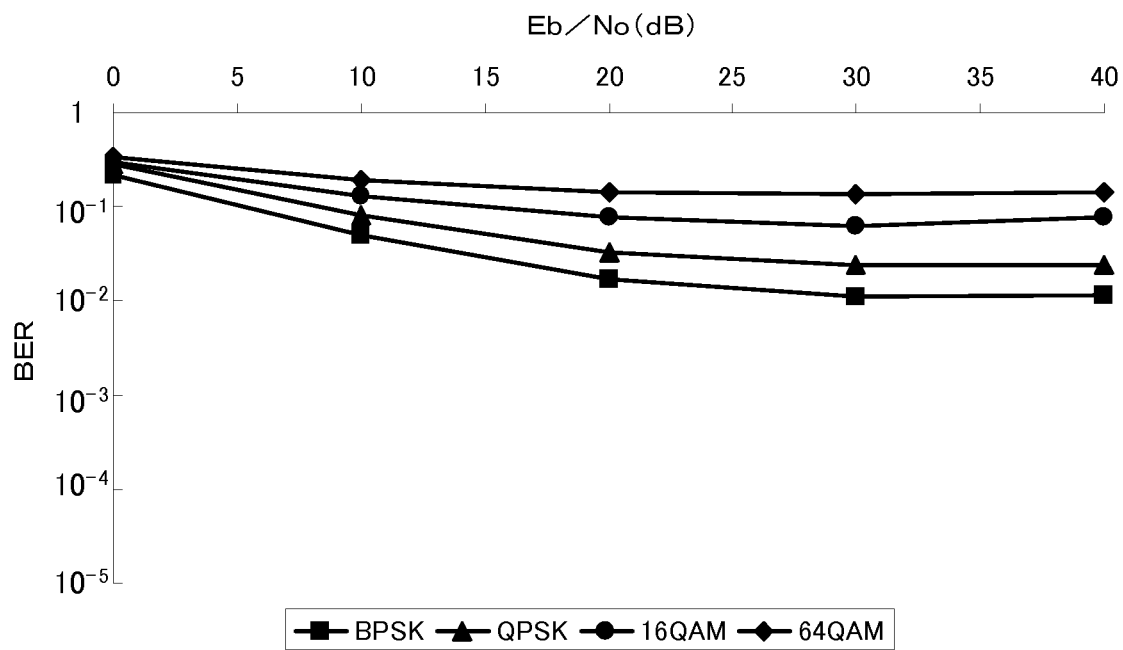
FIG. 13 is a diagram illustrating relationship between BER and modulation type according to the embodiment.
Figure 14:
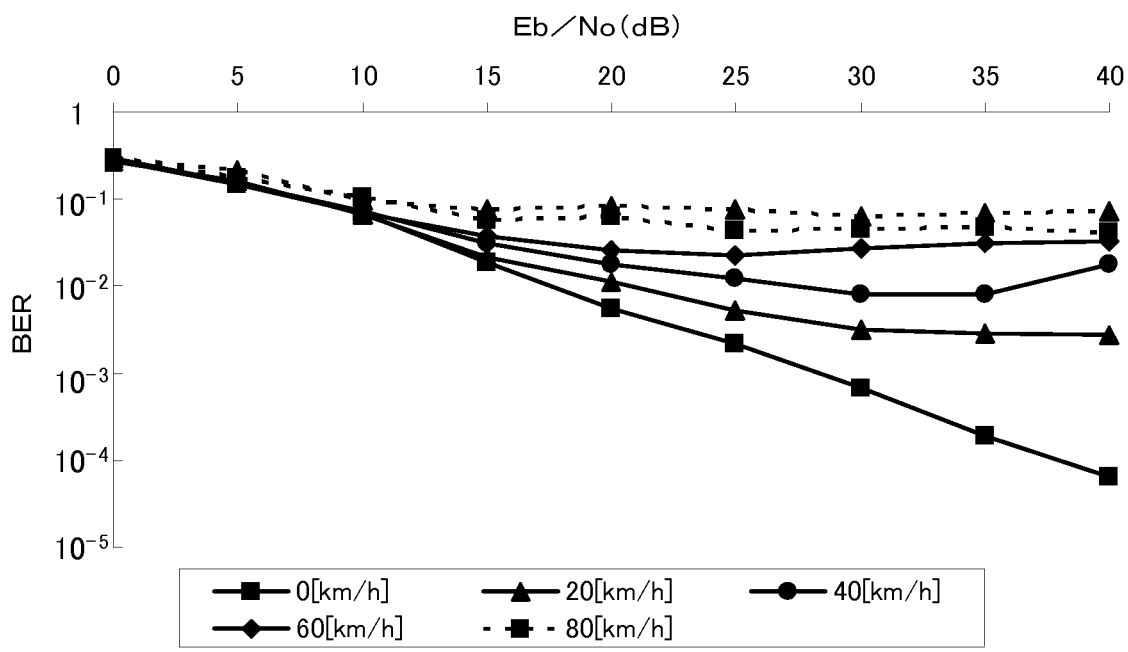
FIG. 14 is a diagram illustrating relationship between the BER and the moving speed according to the embodiment.

A variation in simulated BER (Bit Error Rate) will be described. FIG. 13 is a diagram illustrating the relation between the BER and the modulation type in the communication parameter according to the embodiment. The BER was simulated by using a moving speed of 60 km/h and varying the modulation type. FIG. 13 indicates that the use of a modulation type with a higher transmission rate degrades the BER. FIG. 14 is a diagram illustrating relationship between the BER and the moving speed of the communication apparatus according to the embodiment. The BER was simulated by using QPSK as the modulation type and varying the moving speed. FIG. 14 indicates that an increase in the moving speed degrades the BER. For example, as illustrated in FIG. 14, the channel characteristic varies depending on the varying moving speed. In such a case, changing the communication parameter as in the case of the communication apparatus 1 according to the present embodiment enables preferred wireless communication to be performed according to the channel characteristic.

The embodiment of the present invention is not limited to the above-described embodiment. The IFFT units 14 and 49 can be configured to perform the IDFT instead of the IFFT. The FFT units 20 and 43 cab be configured to perform the DFT instead of the FFT.

Having described and illustrated the principles of this application by reference to one or more preferred embodiment, it should be apparent that the preferred embodiment may be modified in arrangement and detail without departing from the principles disclosed herein and that it is intended that the application be construed as including all such modifications and variations insofar as they come within the spirit and scope of the subject matter disclosed herein.

What is claimed is:

1. A communication apparatus comprising:
a changer that changes a communication parameter based on a channel characteristic;
a selector that selects one of a plurality of switch data sequence for which an autocorrelation function includes a peak present at a position other than an origin and which differ from one another in at least one of the positions and signs of the peak of the autocorrelation function other than the origin, based on the changed communication parameter;
a switch notifier that performs a predetermined process on the switch data sequence selected by the selector to generate a transmission frame and transmits the transmission frame to a second apparatus; and
a switch controller that starts wireless communication using the changed communication parameter after the transmission frame is transmitted.

2. The communication apparatus according to claim 1, wherein:
the switch data sequence is a data sequence multiplied predetermined coefficient to the data sequence having an autocorrelation characteristic.

3. The communication apparatus according to claim 1, further comprising:
a receiver that performs a predetermined process on the transmission frame transmitted by the second apparatus to generate a retransmission switch data sequence after the switch notifier has transmitted the transmission frame to the second apparatus; and
a transmission side correlator that determines whether or not a notification of the change in the communication parameter has been correctly transmitted to the second apparatus based on the peak of the autocorrelation function for the retransmission switch data sequence, wherein:
when the transmission side correlator determines that the notification of the change in the communication parameter has been correctly transmitted to the second apparatus, the switch controller starts wireless communication using the changed communication parameter, and
when the transmission side correlator determines that the notification of the change in the communication parameter has not been correctly transmitted to the second apparatus, the switch controller performs the process again of the switch notifier using transmission power higher than transmission power for the transmission frame transmitted by the switch notifier.

4. The communication apparatus according to claim 3, wherein:
based on the peak of the autocorrelation function for the retransmission switch data sequence, the transmission side correlator determines whether or not the retransmission switch data sequence matches one of the switch data sequence corresponding to the changed communication parameter and a check data sequence used to determine whether or not the notification of the change in the communication parameter has been correctly transmitted to the second apparatus,
the selector selects the check data sequence when the transmission side correlator determines that the retransmission switch data sequence matches the switch data sequence corresponding to the changed communication parameter, and
the switch controller starts wireless communication using the changed communication parameter when the transmission side correlator determines that the retransmission switch data sequence matches the check data sequence, the switch controller allows the process of the switch notifier to be performed on the check data sequence selected by the selector and allows the processes of the receiver and the transmission side correlator to be repeatedly performed when the transmission side correlator determines that the retransmission switch data sequence matches the switch data sequence corresponding to the changed communication parameter, and the switch controller, when the transmission side correlator determines that the retransmission switch data sequence matches neither of the check data sequence and the switch data sequence corresponding to the changed communication parameter, allows the process of the switch notifier to be performed again on the switch data sequence selected by the selector based on the changed communication parameter, using a transmission power higher than the transmission power for the transmission frame transmitted by the switch notifier and allows the processes of the receiver and the transmission side correlator to be repeatedly performed.

5. A communication apparatus comprising:
a receiver that receives a transmission frame from a second apparatus and performs a predetermined process on the transmission frame to generate a parallel signal;
a reception side correlator that determines whether or not a notification of a change in a communication parameter has been received from the second apparatus based on a plurality of switch data sequence for which an autocorrelation function includes a peak present at a position other than the origin and which differ from one another in at least one of the positions and signs of the peak of the autocorrelation function other than the origin; and
a reception side changer that changes the communication parameter to changed communication parameter in the notification received from the second apparatus when the reception side correlator determines that the notification of the change in the communication parameter has been received from the second apparatus.

6. The communication apparatus according to claim 5, wherein:
the switch data sequence is a data sequence multiplied predetermined coefficient to the data sequence having an autocorrelation characteristic.

7. The communication apparatus according to claim 5, further comprising:
a reception side switch notifier that performs a predetermined process on the switch data sequence corresponding to the changed communication parameter to generate the transmission frame and transmits the transmission frame to the second apparatus, when the reception side correlator determines that the notification of the change in the communication parameter has been received from the second apparatus.

8. The communication apparatus according to claim 7, wherein:
based on the peak of the autocorrelation function for the parallel signal, the reception side correlator determines whether or not the parallel signal matches one of the switch data sequence corresponding to the communication parameter and a check data sequence used to determine whether or not the notification of the change in the communication parameter has been correctly received from the second apparatus,
the reception side changer changes the communication parameter based on the switch data sequence determined by the reception side correlator to match the parallel signal when the reception side correlator determines that the parallel signal matches with the check data sequence, and
the reception side switch notifier performs the predetermined process on the check data sequence or the switch data sequence that is determined to match the parallel signal by the reception side correlator, to generate the transmission frame, and transmits the transmission frame to the second apparatus.

9. A communication method comprising:
a change step of changing a communication parameter based on a channel characteristic;
a selection step of selecting one of a plurality of switch data sequence for which an autocorrelation function includes a peak present at a position other than an origin and which differ from one another in at least one of the positions and signs of the peak of the autocorrelation function other than the origin, based on the changed communication parameter;
a switch notification step of performing a predetermined process on the switch data sequence selected in the selection step to generate a transmission frame and transmitting the transmission frame to a second apparatus; and
a switch control step of starting wireless communication using the changed communication parameter after the transmission frame is transmitted.

10. The communication method according to claim 9, wherein:
the switch data sequence is a data sequence multiplied predetermined coefficient to the data sequence having an autocorrelation characteristic.

11. The communication method according to claim 9, further comprising:
a reception step of performing a predetermined process on the transmission frame transmitted by the second apparatus to generate a retransmission switch data sequence after the transmission frame has been transmitted to the second apparatus in the switch notification step; and
a transmission side correlation step of determining whether or not a notification of the change in the communication parameter has been correctly transmitted to the second apparatus based on the peak of the autocorrelation function for the retransmission switch data sequence, wherein:
when it is determined that the notification of the change in the communication parameter has been correctly transmitted to the second apparatus in the transmission side correlation step, in the switch control step, starts wireless communication using the changed communication parameter, and when it is determined that the notification of the change in the communication parameter has not been correctly transmitted to the second apparatus in the transmission side correlation step, in the switch control step, allows the process of the switch notification step to be performed again using transmission power higher than transmission power for the transmission frame transmitted in the switch notification step.

12. The communication method according to claim 11, wherein:
in the transmission side correlation step, based on the peak of the autocorrelation function for the retransmission switch data sequence, determines whether or not the retransmission switch data sequence matches one of the switch data sequence corresponding to the changed communication parameter and a check data sequence used to determine whether or not the notification of the change in the communication parameter has been correctly transmitted to the second apparatus,
when it is determined that the retransmission switch data sequence matches the switch data sequence corresponding to the changed communication parameter in the transmission side correlation step, selects the check data sequence in the selection step, and in the switch control step, when it is determined that the retransmission switch data sequence matches the check data sequence in the transmission side correlation step, starts wireless communication using the changed communication parameter and in the switch control step, when it is determined that the retransmission switch data sequence matches the switch data sequence corresponding to the changed communication parameter in the transmission side correlation step, allows the process of the switch notification step to be performed on the check data sequence selected in the selection step and allows the processes of the reception step and the transmission side correlation step to be repeatedly performed, and in the switch control step, when it is determined that the retransmission switch data sequence matches neither of the check data sequence and the switch data sequence corresponding to the changed communication parameter in the transmission side correlation step, allows the process of the switch notification step to be performed again on the switch data sequence selected in the selection step based on the changed communication parameter, using transmission power higher than transmission power for the transmission frame transmitted in the switch notification step and allows the processes in the reception step and the transmission side correlation step to be repeatedly performed.

13. A communication method comprising:

a reception step of receiving a transmission frame from a second apparatus and performing a predetermined process on the transmission frame to generate a parallel signal;

a reception side correlation step of determining whether or not a notification of a change in a communication parameter has been received from the second apparatus based on a plurality of switch data sequence for which an autocorrelation function includes a peak present at a position other than the origin and which differ from one another in at least one of the positions and signs of the peak of the autocorrelation function other than the origin; and a reception side change step of changing the communication parameter to changed communication parameter in the notification received from the second apparatus when it is determined that the notification of the change in the communication parameter has been received from the second apparatus in the reception side correlation step.

14. The communication method according to claim 13, wherein:

the switch data sequence is a data sequence multiplied predetermined coefficient to the data sequence having an autocorrelation characteristic.

15. The communication method according to claim 13, further comprising:

a reception side switch notification step of performing a predetermined process on the switch data sequence corresponding to the changed communication parameter to generate the transmission frame and transmitting the transmission frame to the second apparatus, when it is determined that the notification of the change in the communication parameter has been received from the second apparatus in the reception side correlation step.

16. The communication method according to claim 15, wherein:

in the reception side correlation step, based on the peak of the autocorrelation function for the parallel signal, it is determined whether or not the parallel signal matches one of the switch data sequence corresponding to the communication parameter and a check data sequence used to determine whether or not the notification of the change in the communication parameter has been correctly received from the second apparatus, in the reception side change step, changes the communication parameter based on the switch data sequence determined to match the parallel signal in the reception side correlation step when it is determined that the parallel signal matches the check data sequence in the reception side correlation step, and in the reception side notification step, performs the predetermined process on the check data sequence or the switch data sequence that is determined to match the parallel signal in the reception side correlation step, to generate the transmission frame, and transmits the transmission frame to the second apparatus.

* * * * *